United States Patent
Lin et al.

(10) Patent No.: US 9,569,874 B2
(45) Date of Patent: Feb. 14, 2017

(54) SYSTEM AND METHOD FOR PERSPECTIVE PRESERVING STITCHING AND SUMMARIZING VIEWS

(71) Applicant: International Business Machines Corporation, Armonk, NY (US)

(72) Inventors: Chung-Ching Lin, White Plains, NY (US); Sharathchandra U. Pankanti, Darien, CT (US); Karthikeyan Natesan Ramamurthy, Yorktown Heights, NY (US); Aleksandr Y. Aravkin, Bronx, NY (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/732,345

(22) Filed: Jun. 5, 2015

(65) Prior Publication Data

US 2016/0358355 A1   Dec. 8, 2016

(51) Int. Cl.
*G06K 9/50* (2006.01)
*G06T 11/60* (2006.01)
(Continued)

(52) U.S. Cl.
CPC ............ *G06T 11/60* (2013.01); *G06K 9/0063* (2013.01); *G06K 9/4609* (2013.01);
(Continued)

(58) Field of Classification Search
CPC ........... G06T 11/60; G06T 2207/10032; G06T 2207/20221; G06K 9/4609; G06K 9/4671
(Continued)

(56) References Cited

U.S. PATENT DOCUMENTS 6,597,818 B2   7/2003 Kumar et al.
7,545,957 B2 *  6/2009 Cornog ................. G06T 7/2033
                                                    382/103
(Continued)

FOREIGN PATENT DOCUMENTS

EP              2005748 B1   7/2013
WO      WO 2006/020356 A2   2/2006
WO      WO 2009/064513 A1   5/2009

OTHER PUBLICATIONS

Quaritsch et al. "Networked UAVs as aerial sensor network for disaster management applications." e&I Elektrotechnik und Informationstechnik 127.3 (2010): 56-63.
(Continued)

*Primary Examiner* — Yosef Kassa
(74) *Attorney, Agent, or Firm* — Alexa L. Ashworth, Esq.; McGinn IP Law Group, PLLC

(57) ABSTRACT

A method and a system of stitching a plurality of views of a scene, the method including extracting points of interest in each view to include a point set from each of the plurality of image views of the scene, matching the points of interest and reducing an outlier, grouping the matched points of interest in a plurality of groups, determining a similarity transformation with a smallest rotation angle for each grouping of the match points, generating virtual matching points on a non-overlapping area of the plurality of image views, generating virtual matching points on an overlapping area for each of the plurality of image views, and calculating piecewise projective transformations for the plurality of image views.

22 Claims, 35 Drawing Sheets

(51) Int. Cl.
- *G06K 9/46* (2006.01)
- *G06K 9/00* (2006.01)
- *G06T 7/40* (2006.01)
- *G06K 9/62* (2006.01)

(52) U.S. Cl.
CPC ......... *G06K 9/4638* (2013.01); *G06K 9/4671* (2013.01); *G06T 7/402* (2013.01); *G06K 2009/6213* (2013.01); *G06T 2207/10032* (2013.01); *G06T 2207/20104* (2013.01); *G06T 2207/20221* (2013.01)

(58) Field of Classification Search
USPC ............... 382/171, 219, 278, 282, 284, 294; 358/537, 538, 448, 450, 453
See application file for complete search history.

(56) References Cited

U.S. PATENT DOCUMENTS

| | | | | |
|---|---|---|---|---|
| 7,664,296 B2 * | 2/2010 | Tsubaki | ............ | G06F 17/30265 382/100 |
| 7,848,571 B2 * | 12/2010 | Ratner | ................. | G06K 9/4638 382/173 |
| 8,340,464 B2 * | 12/2012 | Watanabe | ............ | H04N 1/3876 345/619 |
| 8,379,018 B2 * | 2/2013 | Carr | ........................ | G06T 17/10 345/420 |
| 8,538,175 B1 * | 9/2013 | Epstein | .................. | H04N 19/20 382/232 |
| 8,614,708 B2 * | 12/2013 | Winnemoeller | ........ | G06T 17/20 345/423 |
| 8,918,209 B2 | 12/2014 | Rosenstein et al. | | |

OTHER PUBLICATIONS

Helala et al., "Mosaic of near ground UAV videos under parallax effects." Distributed Smart Cameras (ICDSC), 2012 Sixth International Conference on. IEEE, 2012.

Duchaineau et al. "Toward fast computation of dense image correspondence on the GPU." Proceedings of HPEC (2007): 91-92.

Brown et al. "Automatic panoramic image stitching using invariant features." International journal of computer vision 74.1 (2007): 59-73.

Cai et al., "The Stitching of Aerial Videos from UAVs," Image and Vision Computing New Zealand (IVCNZ), 2013 28th International Conference on Image and Vision Computing New Zealand.

Zheng et al., "A nearly real-time UAV video flow mosaic method." Proc. SPIE 9260, Land Surface Remote Sensing II, 926048 (Dec. 9, 2014).

* cited by examiner

SYSTEM AND METHOD FOR PERSPECTIVE PRESERVING STITCHING AND SUMMARIZING VIEWS

This invention was made with Government support under Contract No.: HR0011-13-C-0022 awarded by Defense Advanced Research Projects Agency (DARPA). The Government has certain rights in this invention.

BACKGROUND OF THE INVENTION

Field of the Invention

The disclosed invention relates generally to image processing, and more particularly, but not by way of limitation, relating to image stitching and summarizing aerial views.

Description of the Related Art

UAVs (Unmanned Aerial Vehicles) are emerging as de facto imaging method for many applications including defense, surveillance, asset management. Surveillance and reconnaissance tasks are currently often performed using an airborne platform such as a UAV. The airborne platform can carry different sensors. EO/IR cameras can be used to view a certain area from above. To support the task from the sensor analyst, different image processing techniques can be applied on the data, both in real-time or for forensic applications. Effective summarization of view of the multiple cameras on an (unmanned) aerial vehicle is of great importance in such uses. Additionally, a method of stitching images provided by such UAVs is needed.

Stitching images for use in visual analytic business is of great importance. For example, creating a panoramic view from videos of multiple cameras is a critical component for many analytic applications including defense, surveillance, asset management.

Algorithms for aligning and stitching images into seamless photo-mosaics are among the oldest and most widely used in computer vision. One of the most important aspects of image stitching is to seamlessly blend overlapping images, even in the presence of parallax, lens distortion, and scene illumination, to provide a mosaic without any artifacts that looks as natural as possible. Evidently, there is some subjectivity in interpreting how natural a panorama or a mosaic looks. Furthermore, the stitching techniques must be able to extrapolate well to the regions of the panorama where there is information only from a single image.

Therefore, it is desirable to provide an improved way to stitch images and provide image summarization.

SUMMARY OF INVENTION

In view of the foregoing and other problems, disadvantages, and drawbacks of the aforementioned background art, an exemplary aspect of the disclosed invention provides a method of image stitching and aerial image summarization.

One aspect of the present invention provides a stitching method, that uses a smooth stitching field over the entire target image, while accounting for all the local transformation variations. Computing the warp is fully automated and uses a combination of local homography and global similarity transformations, both of which are estimated with respect to the target. The disclosed invention mitigates the perspective distortion in the non-overlapping regions by linearizing the homography and gradually changing it to the global similarity. The disclosed method is easily generalized to multiple images, and allows one to automatically obtain the best perspective in the panorama. It is also more robust to parameter selection, and hence more automated compared with state-of-the-art methods. The benefits of this method are demonstrated using a variety of challenging cases.

Another example aspect of the disclosed invention is to provide a system of stitching a plurality of views of a scene, the system including a non-transitory computer readable medium storing data including the plurality of view of the scene, and a processor processing the data on the non-transitory computer readable medium. The processor extracts points of interest in each view stored on the computer readable medium to create a point set from each of the plurality of image views of the scene. The processor matches the points of interest and reduces outliers. The processor groups the matched points of interest in a plurality of groups. The processor determines a similarity transformation for each grouping of the match points, and the processor calculates piecewise projective transformations for the plurality of image views.

Yet another example aspect of the disclosed invention is to provide a method of developing summary visualization of the visual content in a plurality of videos of a scene, the method including processing the videos to extract objects and activities of interest, establishing a frame of reference with respect a visual content of the video so that the objects in scene provide a least distracting view of the scene according to a predetermined criteria, for each candidate frame in the video, relating a portion of its content with a portion of another frame of a gallery frame by finding common portion of visual content in the corresponding frames, relating the portion of the candidate frame to a common frame of reference by finding a chain of successive relationships that relate a candidate frame content to the reference video frame, visualizing an overall content by rendering contents of the video frames in common frame of reference as a mosaic, and overlaying the activities and objects of interest on the mosaic.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

Figure 1A:
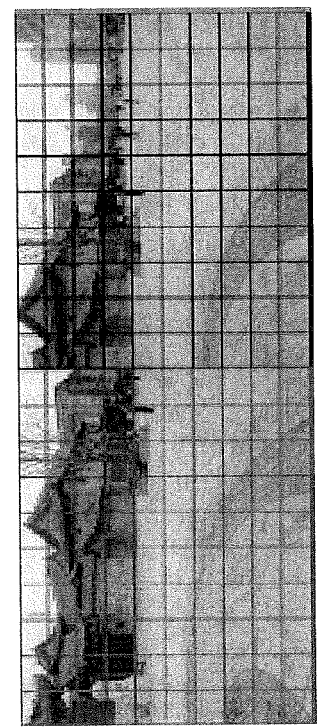
FIGS. 1A to 1E show images using an example embodiment of the invention.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Several assumptions can be imposed on the stitching field during image alignment and tolerance to parallax can also be imposed. The disclosed invention includes a new method that incorporating several assumptions to make the panorama look more accurate in order to depict the actual image. To mitigate perspective distortion that occurs in As-Projective-As-Possible (APAP) related art, the disclosed invention linearizes the homography in the regions that do not overlap with any other image, and then automatically estimate a global similarity transform using a subset of corresponding points in overlapping regions. Finally, the disclosed invention extrapolates smoothly between the homography and the global similarity in the overlapping regions, and using the linearized homography (affine) and the global similarity transform in the non-overlapping regions. The smooth combination of two stitching fields (homography/linearized homography and global similarity) help us achieve: (a) a fully continuous and smooth stitching field with no bending artifacts, (b) improved perspective in the non-overlapping regions using a global similarity transform, (c) full benefits of the state-of-the-art alignment accuracy offered by APAP.

A detailed presentation of a method of the disclosed invention is provided in the following. First, the moving DLT method to estimate the local homography is described, and an approach to linearize it in the non-overlapping regions is provided. Then, the computation of a global similarity transformation between the reference and the target images is explained. Since many similarity transformations are possible, the disclosed invention includes to automatically choose the one with the lowest rotation angle as the best candidate. Finally, the details of the warp, which is constructed by combining the homography or its linearized version across the whole image with the global similarity, are presented.

An example aspect of the disclosed invention is to provide a method for stitching a plurality of views of a scene, the method including extracting points of interest in each view to comprise of a point set from each of the plurality of image views of the scene, matching the points of interest and reducing outliers, grouping the matched points of interest in a plurality of groups, determining a similarity transformation with smallest rotation angle for each grouping of the matched points, generating virtual matching points on non-overlapping area of the plurality of image views, generating virtual matching points on overlapping area for each of the plurality of image views, and calculating piecewise projective transformations for the plurality of image views.

The points of interest representations can be translational invariant representations of edge orientations. The points of interest representations can be scale invariant feature transform (SIFT) points. The method can be stored in a non-transitory computer readable medium and executed by a processor. The plurality of views of a scene are remotely captured from an aerial view. Each group of the matched plurality points is used to calculate an individual similarity transformation, and then the rotation angles corresponding to the transformations are examined and the one with the smallest rotation angle is selected. When extracting the points of interest, for each of the plurality of views, finding key points and texture descriptors.

The processor calculates piecewise projective transformations for the plurality of image views on overlapping areas. The processor determines the similarity transformation with a smallest rotation angle for each grouping of the match points. The processor calculates linearized transformations for the plurality of image views. The processor uses weighted linearized transformations to extrapolate non-overlapping areas. The processor generates virtual matching points on non-overlapping area of the plurality of image views, and the processor generates virtual matching points on overlapping area for each of the plurality of image views. The points of interest representations are translation-invariant representations of edge orientations. The points of interest representations are scale invariant feature transform (SIFT) points. The plurality of views of a scene are remotely captured from an aerial view and stored on the non-transitory computer readable medium for execution by the processor. Each group of the matched plurality points is used to calculate an individual similarity transformation, then the rotation angles corresponding to the transformations are examined and the one with the smallest rotation angle is selected by the processor.

A user interface provides interaction with overlays to see the details of objects and activities including the original video. The activities are tracks, the common reference is related to a geographic map, and a user interface can query and search the objects and activities. A system including a non-transitory computer readable medium and a processor can execute the method of the disclosed invention.

Figure 1B:
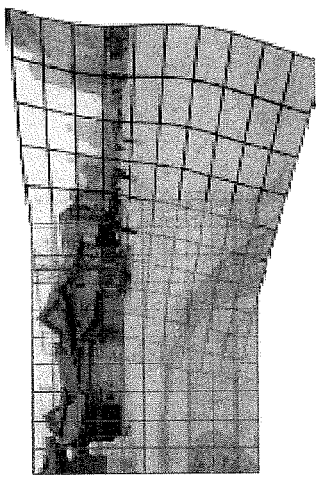
Figure 1C:
Figure 1D:
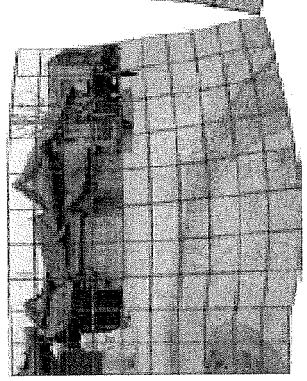
Figure 1E:
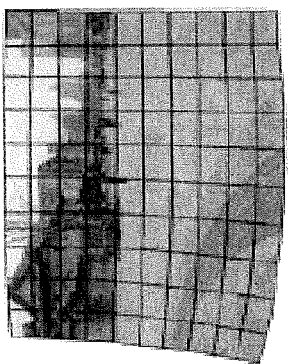
Figure 1E:
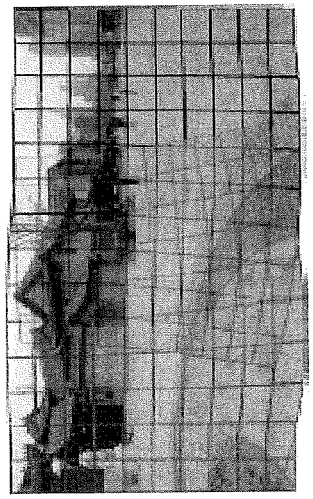

FIGS. 1A to 1E show the application of an exemplary embodiment of invention. FIG. 1A shows the original images, FIG. 1B shows warp after applying moving DLT with Gaussian weighting, FIG. 1C shows extrapolation of non-overlapping areas using homography linearization and t-weighting, FIG. 1D shows the final warps after integrating global similarity transformation, and FIG. 1E shows the final result.

Local Homography Model

Let the target and the reference images be denoted by I and image I'. Given a pair of matching points $p=[x\ y]^T$ and $p'=[x'\ y']^T$, between I and I', the homographic transformation $p'=h(p)$ can be represented as $$h_x(p) = \frac{h_1 x + h_2 y + h_3}{h_7 x + h_8 y + h_9}, \quad (1)$$

$$h_y(p) = \frac{h_4 x + h_5 y + h_6}{h_7 x + h_8 y + h_9}. \quad (2)$$

In homogeneous coordinates $p=[x\ y\ 1]^T$ and $p'=[x'\ y'\ 1]^T$ it can be represented up to a scaling using the homography matrix $H \in \mathbb{R}^{3 \times 3}$ as $$\hat{p}' \sim H\hat{p}. \quad (3)$$

The columns of H are given by $h_1=[h_1\ h_4\ h_7]^T$, $h_2=[h_2\ h_5\ h_8]^T$, and $h_3=[h_3\ h_6\ h_9]^T$. Taking a cross product on both sides of formula (3), a computer processor obtains:

$$0_{3 \times 1} = \hat{p}' \times H\hat{p} \quad (4)$$

which can be rewritten as can be re-written as follows:

$$0_{3 \times 1} = \begin{bmatrix} 0_{3 \times 1} & -\hat{p}^T & y'\hat{p}^T \\ \hat{p}^T & 0_{3 \times 1} & -x'\hat{p}^T \\ -y\hat{p}^T & x'\hat{p}^T & 0_{3 \times 1} \end{bmatrix} \begin{bmatrix} h_1 \\ h_2 \\ h_3 \end{bmatrix}. \quad (5)$$

The 9×1 vector is denoted in formula (5) as "h". Since only two rows of the 3×9 matrix in formula (5) are linearly independent, for a set of N matching points $\{\hat{p}_i\}_{i=1}^N$ and $\{\hat{p}_i'\}_{i=1}^N$, a computer processor can estimate "h" using $$h = \underset{h}{\operatorname{argmin}} \sum_{i=1}^{N} \left\| \begin{bmatrix} a_{i,1} \\ a_{i,2} \end{bmatrix} h \right\|^2 = \underset{h}{\operatorname{argmin}} \|Ah\|^2, \quad (6)$$

where $a_{i,1}$ and $a_{i,2}$ correspond to the two rows of the matrix in formula (5). The disclosed invention also incorporates the constraint $\|h\|^2=1$ since the homographic transformation has only 8 degrees of freedom.

Previously it was introduced moving DLT framework to estimate local homography by including locality-enforcing weights in the objective of formula (6). The local homography at the location $p_j$ is estimated as $$h_j = \underset{h_j}{\operatorname{argmin}} \sum_{i=1}^{N} \omega_{i,j} \left\| \begin{bmatrix} a_{i,1} \\ a_{i,2} \end{bmatrix} h \right\|^2 \quad (7)$$

which can be written in matrix form as $$h_j = \underset{h}{\operatorname{argmin}} \|W_j Ah\|^2, \quad (8)$$

where $W_j = \operatorname{diag}([\omega_{1,j}, \omega_{1,j} \ldots \omega_{N,j}, \omega_{N,j}])$. The weights are generated using the offsetted Gaussian which assumes high value for pixels in the neighborhood of $p_j$ and equal values for those that are very far, $$\omega_{i,j} = \max(\exp(-\|p_i - p_j\|^2/\sigma^2), \gamma). \quad (9)$$

The parameter $\gamma \in [0\ 1]$ is the offset used to prevent numerical issues. Note that the local homography can be computed only in the regions of the target image that overlap with the reference image. For each pixel in the non-overlapping regions, the transformation is computed as a weighted linear combination of the local homographies in the overlapping regions. Here it becomes important to choose a proper offset to avoid extrapolation artifacts. This is demonstrated in FIG. 1B, where setting $\gamma=0$ leads to "wavy" effects due to the isotropic nature of Gaussian weighting, whereas choosing a proper offset leads to a good result. Even in this case, the perspective distortion in the non-overlapping area is apparent with APAP.

In the method of the disclosed invention, the moving DLT is used without offset in overlapping area to estimate the local homography, and extrapolate to the non overlapping area using homography linearization, as described in the following section.

This reduces the perspective distortion, and weighting scheme for extrapolation of the disclosed invention is less sensitive to parameter selections compared to other state-of-the-art approaches.

Homography Linearization

The extrapolation of homographic transformation in the non-overlapping areas produces extreme and un-natural scaling effects, as seen in FIG. 1B. The reason for this effect can be understood by considering the 1-D perspective transform, $x'=ax+b/cx+d$. If a computer processor estimates the parameters $\{a, b, c, d\}$ using a set of corresponding points, outside the range of the available corresponding points as well, the relationship between x and x' will be non-linear. This translates to severe perspective distortion in 2-D. However, this distortion can be minimized by linearizing the transformation.

With images, the linearization of homography at any point q in the neighborhood of the anchor point p can be understood by considering the Taylor series of the homographic transformation $h(q)$, where $h: \mathbb{R}^2 \to \mathbb{R}^2$ $$h(q) = h(q) + J_h(p)(q-p) + o(\|q-p\|), \quad (10)$$

where $J_h(p)$ is the Jacobian of the homography h at the point p. The first two terms in formula (10) provide the best linearization for $h(q)$, and it will be denoted as $h_p^L(q)$. Since, if h is differentiable at p, $J_h(p)$ is invertible, the linearization of homography is an affine transformation. However, it is not straightforward to compute linearization at an arbitrary point q in the non-overlapping region as in the case of 1-D data, since the boundary between the overlapping and the non-overlapping regions could contain multiple points and one would not know where the Jacobian has to be computed. Therefore, one would consider anchor points in the boundary for linearization and compute a weighted average of the transformations. For a set of R anchor points $\{p_i\}_{i=1}^R$ at the boundary with possibly different local homographies, the weighted combination of linearizations is given as:

$$h^L(q) = \sum_{i=1}^{R} \alpha_i (h(p_i) + J_h(p_i)(q - p_i)). \quad (11)$$

It is assumed $\alpha_i$ to be a function of $\|q-p_i\|$, and in particular one considers the Gaussian weighting where $\alpha_i=\exp(-\|q-pi\|^2)$, or the Student's-t weighting where $$\alpha_i = \left(1 + \frac{\|q-p_i\|^2}{v}\right)^{\frac{-(v+1)}{2}}.$$

Student's-t weighting is more robust since that tail of the distribution decays slowly compared to Gaussian and hence when q is far from anchor points, all the anchor points are given similar weighting.

However, if Gaussian weighting is chosen, the tail should be made flat at the offset parameter to avoid The stitching result using our extrapolation method is shown in FIG. 1C. Using the linearized homography to extrapolate the non-overlapping area has less perspective distortions than the result using APAP. The result is similar to the stitching result using dual-homography warping. However, with the method of the disclosed invention, there is no need to estimate two homographies of distant plane and ground plane. The present method can adapt to the more complicated scenes and is a generalized method in comparison of dual-homography method. It does not need the parameter that should be determined case by case in APAP, and it is not sensitive to the parameter selections.

Global Similarity Transformation

In the previous section, a method to linearize the homography was introduced to reduce the perspective distortion in the overlapping areas. In the following sections, the disclosed invention will provide approaches to further reduce the distortions and hence make the panorama look natural. The idea is to use a similarity transformation in the non-overlapping areas in the target image, since it will not introduce any perspective distortions.

Figure 2:
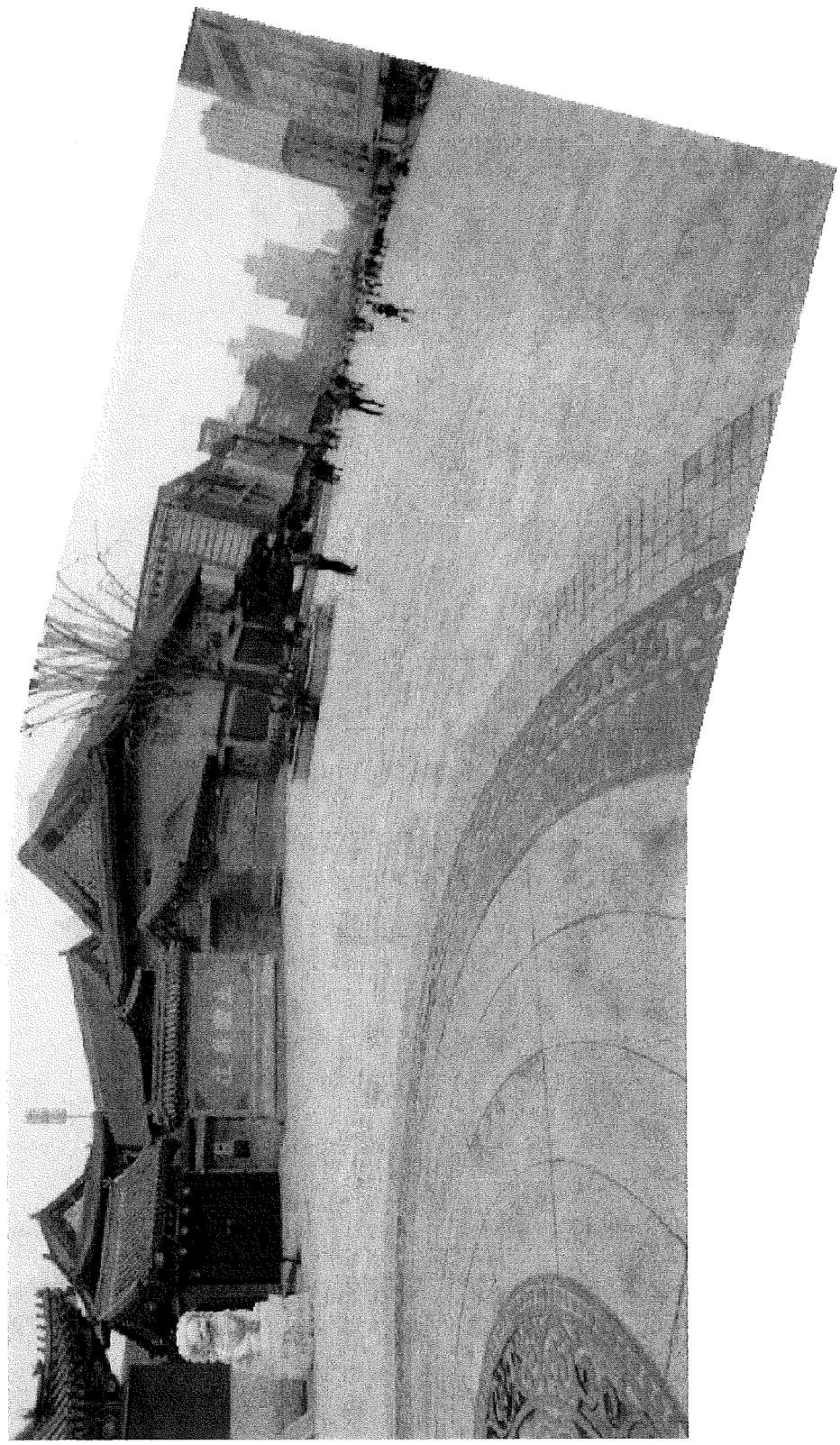
FIG. 2 shows stitching result of temple dataset using SPHP.

The global similarity transformation, must approximate the camera motion between the target and the reference images, which can then be used to compensate for it. However, finding a global similarity transformation using all point matches may result in non-optimal solution particularly when the overlapping areas contain distinct image planes. An issue is apparent in FIG. 2, which shows the stitching result of SPHP. Note that SPHP uses the global homography transformation to uniquely determine the global similarity, which may not approximate the camera motion well.

The disclosed invention includes an approach to compute an optimal similarity transformation between the reference and the target images by segmenting the corresponding points in the following manner. After obtaining the feature point matches, first the outliers are removed using RANSAC (Random Sample Consensus) with threshold $\epsilon_g$. Then, one would RANSAC with a threshold $\epsilon_1$ is used to find a homography of the plane with largest inliers. $\epsilon_1$ is smaller than $\epsilon_g$. Third, the inliers are removed. The second and third procedures are repeated until the number of inliers is smaller than $\kappa$. Each group of feature point matches is used to calculate an individual similarity transformation. Then, the rotation angles corresponding to the transformations are examined and the one with the smallest rotation angle is chosen.

Figure 3:
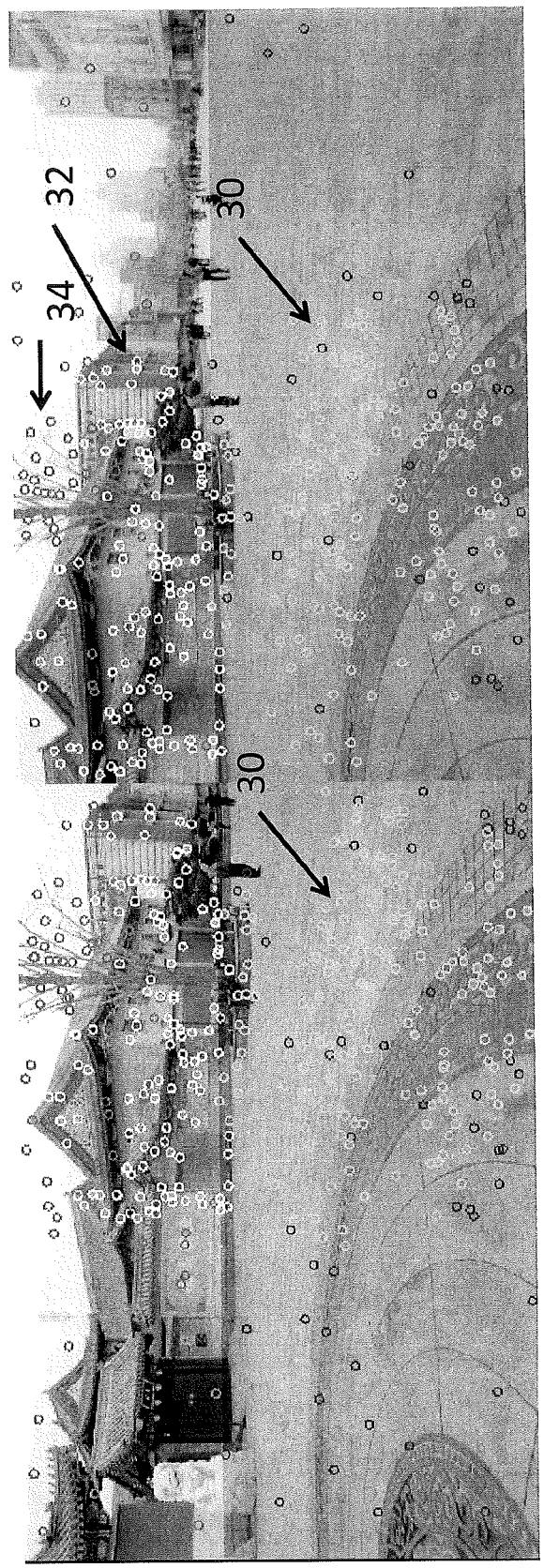
FIG. 3 shows grouping results.

FIG. 3 shows an example of the grouping results. The green 30 and yellow 32 circles on the figure belong to two different groups of point correspondences. The red circles 34 do not belong to any group. In this example, the group with yellow points 32 generate the optimal global similarity transformation with the least rotation angle.

Integration of Global Similarity Transformation

After the global similarity transformation is calculated, it is used to adjust warps of target image to have a better perspective view of overall panorama. If one only adjusts the transformations on the non-overlapping area, the stitching result may have unnatural visual effect. In order to adjust the local transformations of the target image smoothly, a processor in a computer would gradually update the local transformations of entire target image to the global similarity transformation. The processor would update the local transformation using the following equation:

$$Hs_i^{(2)}=\mu_h H_i^{(2)}+\mu_s S, \qquad (12)$$

where $H_i^{(2)}$ is i-th local transformation, $Hs_i^{(2)}$ is updated local transformation, S is the global transformation. $\mu_h$ and $\mu_s$ are weighting coefficients.

$$\mu_h+\mu_s=1, \qquad (13)$$

where $\mu_h$ and $\mu_s$ are between 0 and 1, and decided as follows:

$$\mu_h(i)=(x_{max}-x(i))/(x_{max}-x_{min}), \qquad (14)$$

$$\mu_s(i)=(x(i)-x_{min})/(x_{max}-x_{min}), \qquad (15)$$

where $x_{min}$ and $x_{max}$ are the point with smallest value on x axis of warped target image.

After updating the warps of target image with global similarity transformation, this causes the aligned overlapping areas between reference image and target image no longer align.

$$H_i^{(2)} \rightarrow Hs_i^{(2)} \qquad (16)$$

Therefore, the processor would need to compensate the changes by appropriately propagating the changes to the reference image. The local transformation of reference image can be obtained as:

$$Hs_i^{(1)}=Hs_i^{(2)}inv(H_i^{(2)}) \qquad (17)$$

FIG. 1D show the final warping results of reference image and target image. And, the final result is shown on FIG. 1E. As one can see, the stitching result can solve the parallax error and keep the perspective of both images.

Alternatively, the following formula can be used if we gradually update the local transformations of entire target image to the global similarity transformation using the following equation:

$$\hat{H}_i^{(t)}=\mu_h H_i^{(t)}+\mu_s S. \qquad (18)$$

Here, $H_i^{(t)}$ is $i^{th}$ local homography, $\hat{H}_i^{(t)}$ is updated local transformation, S is the global similarity transformation. S and $\mu_s$ are weighting coefficients. The superscript (t) refers to the target image and the superscript (r) denotes the reference image. We also constrain $\mu_h+\mu_s=1$, where $\mu_h$ and $\mu_s$ are between 0 and 1. They are computed as, $$\mu_h(i)=(\overrightarrow{\kappa_m p(i)},\overrightarrow{\kappa_m \kappa_M})/|\overrightarrow{\kappa_m \kappa_M}|, \qquad (19)$$

$$\mu_s(i)=1-\mu_h(i), \qquad (20)$$

where $\kappa$ is the projected point of warped target image on the $\overrightarrow{o_r o_t}$ direction. $o_r$ and $o_t$ are the center points of the reference image and the warped target image. $\kappa_m$ and $\kappa_M$ are the points with smallest and largest value of $(\overrightarrow{o_r p(i)}, \overrightarrow{o_r o_t})$ respectively. Here, p(i) is the location of the $i^{th}$ location in the final panorama.

Updating the warps of target image with global similarity transformation causes misalignment of overlapping areas between reference image and target image that were previously aligned. Therefore, we need to compensate the changes by appropriately propagating the changes from the target image to the reference image. The local transformation of the reference image can be now obtained as $$\hat{H}_i^{(r)} = \hat{H}_i^{(o)}(H_i^{(o)})^{-1} \tag{21}$$

EXPERIMENTS

Comparative experiments of algorithm of the disclosed invention on a variety of existing datasets made available were conducted. The compared methods include MICROSOFT Image Composite Editor (ICE), APAP, SPHP with global homography, SPHP with local homographies computed with APAP (SPHP+APAP). In the experiments, the same set of parameters are used as suggested in the respective related art. $\sigma$ (for the moving DLT weight) is 12.5, $\nu$ (for student's t-penalty) is 5, $\epsilon_g$ (for the threshold of global RANSAC error function) is 0.1, $\epsilon_l$ (for the threshold of the local RANSAC error function) is 0.001, and $\kappa$ (for the threshold of inlier number) is 50. The method of the disclosed invention typically takes, for example, from 20 to 30 seconds with a 2.7 GHz (gigahertz) CPU (Central Processing Unit) and 16 GB RAM (Random Access Memory) to stitch two images with 800×600 resolution. For the sake of being concise, comparisons are shown only on Temple (FIGS. 4A to 4O) and Railtracks (FIGS. 5A to 5O) datasets.

Figure 4A:
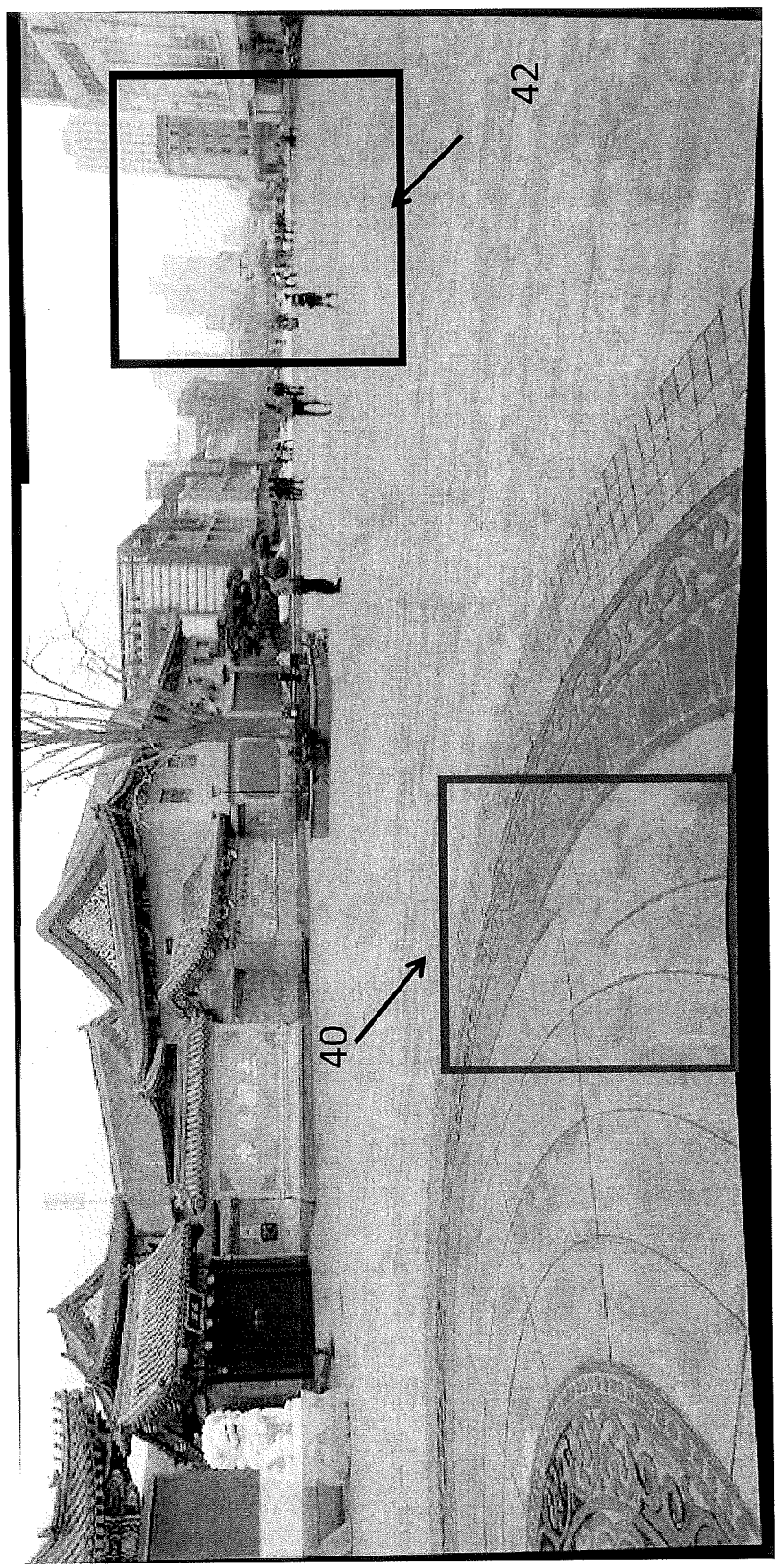
FIGS. 4A to 4O illustrate comparisons with state-of-the-art image stitching techniques on the temple image dataset.
Figure 4C:
Figure 4B:
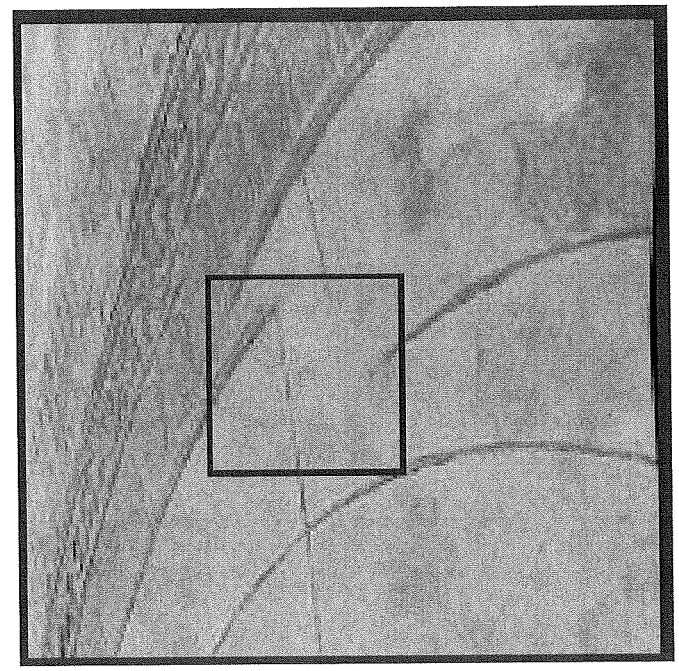
Figure 4D:
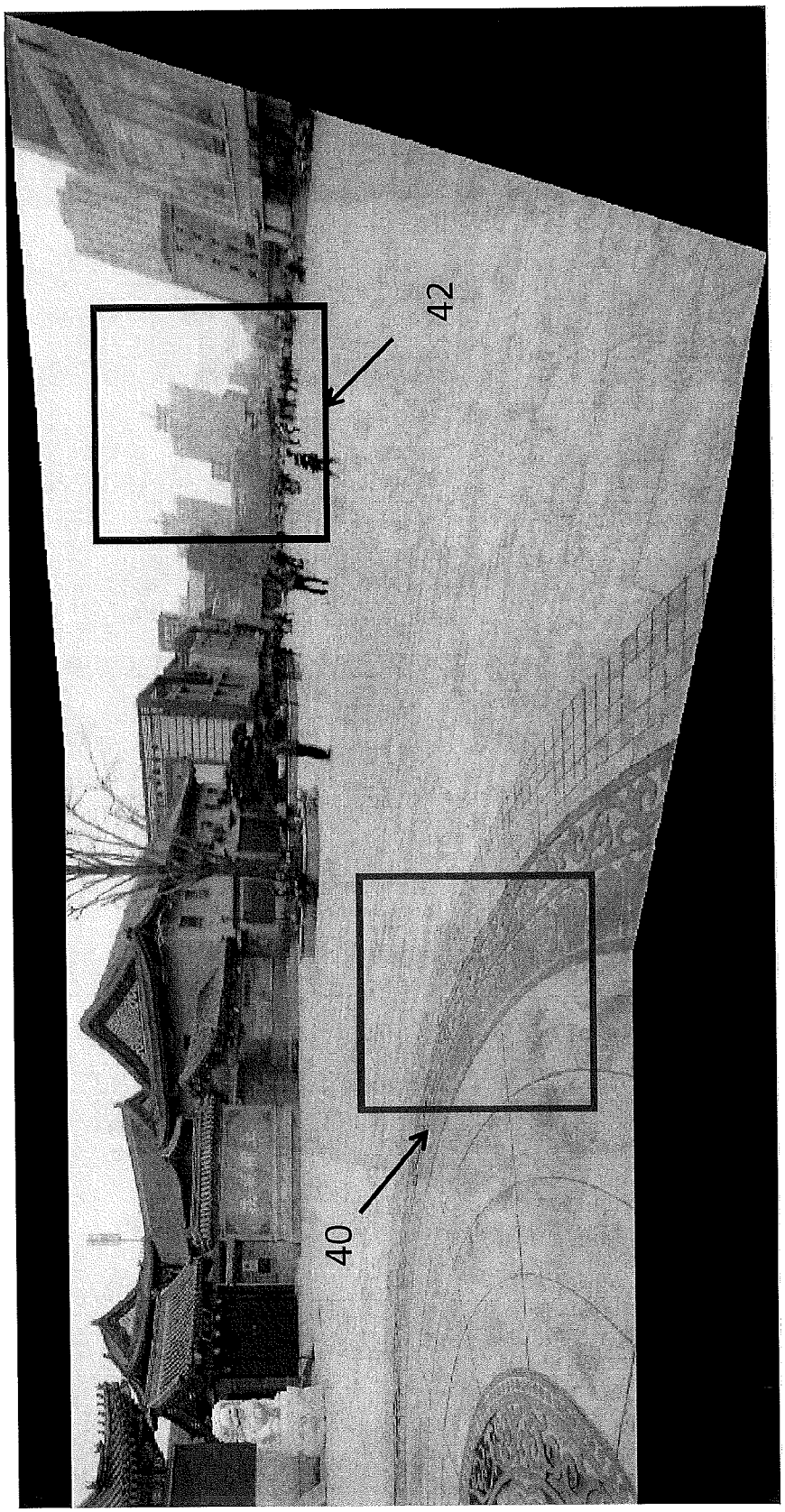
Figure 4F:
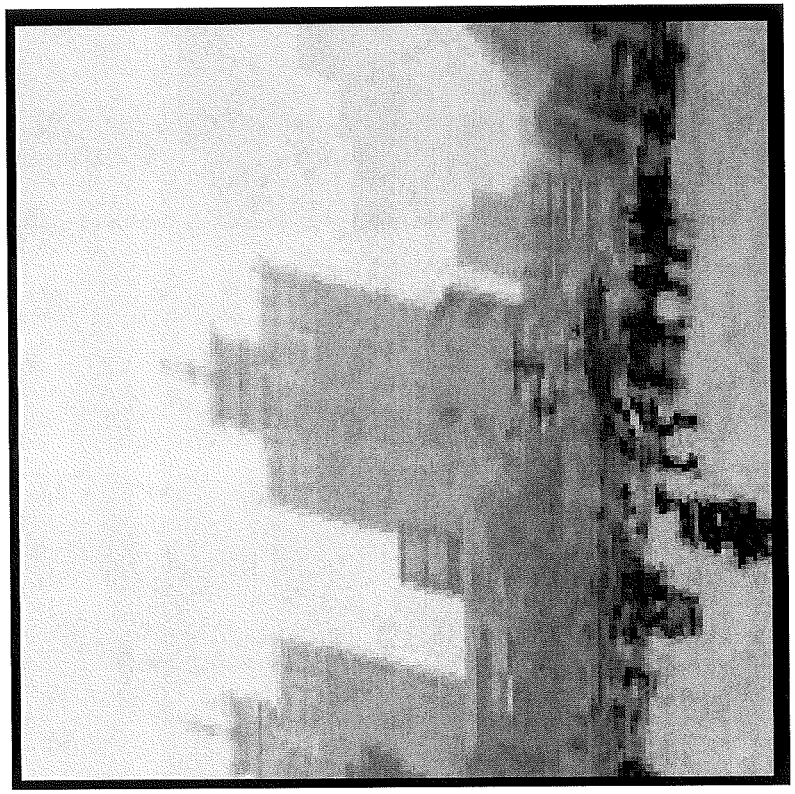
Figure 4E:
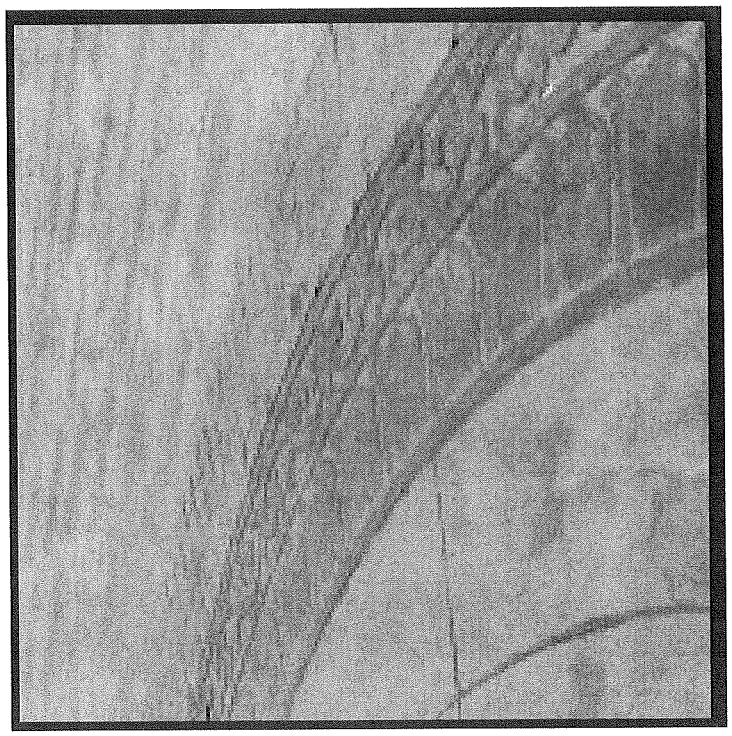
Figure 4G:
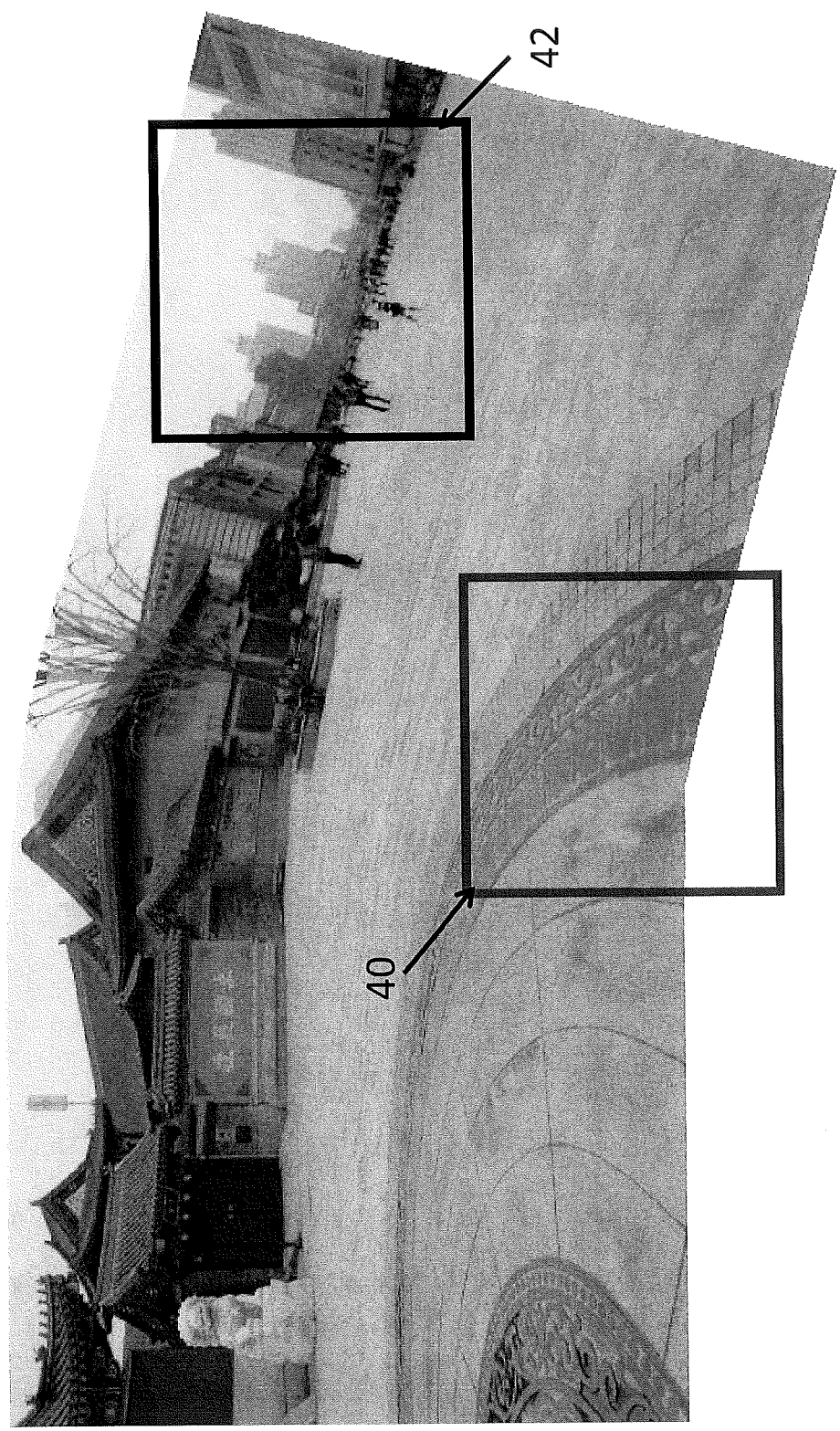
Figure 4I:
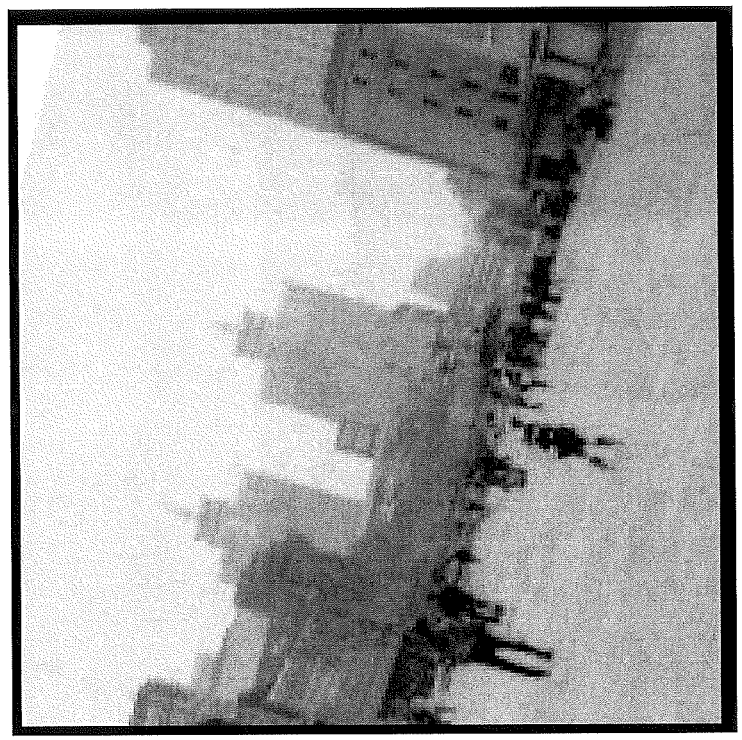
Figure 4H:
Figure 4J:
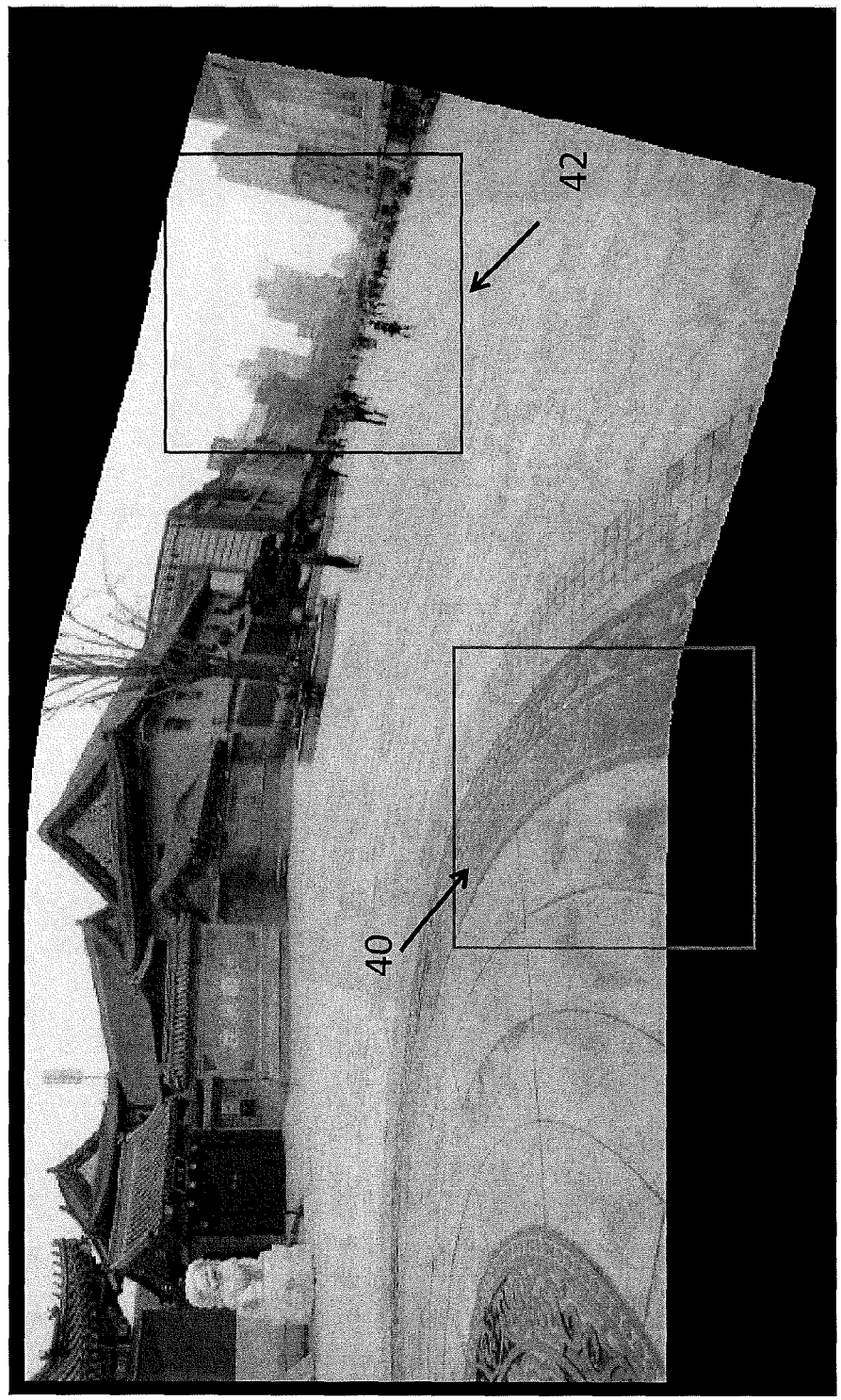
Figure 4L:
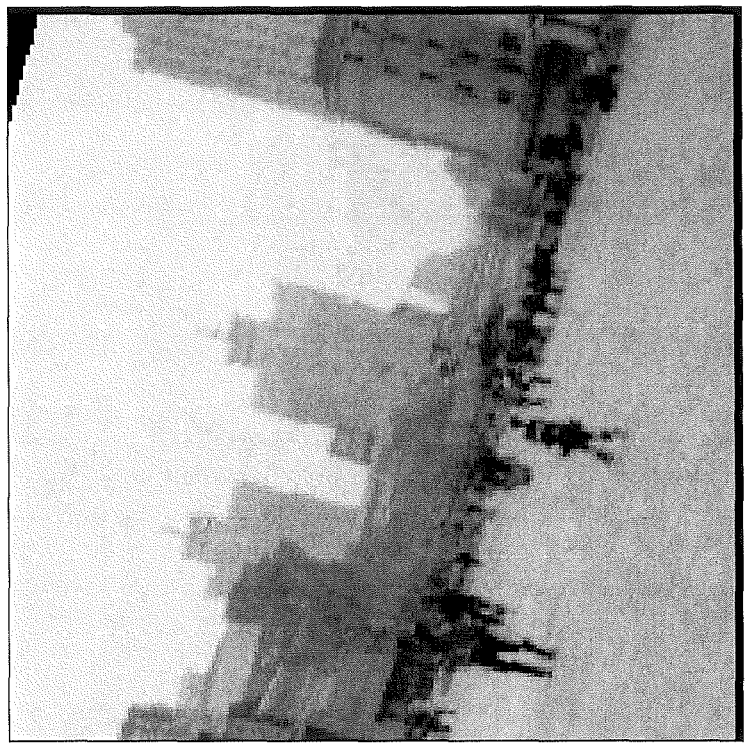
Figure 4K:
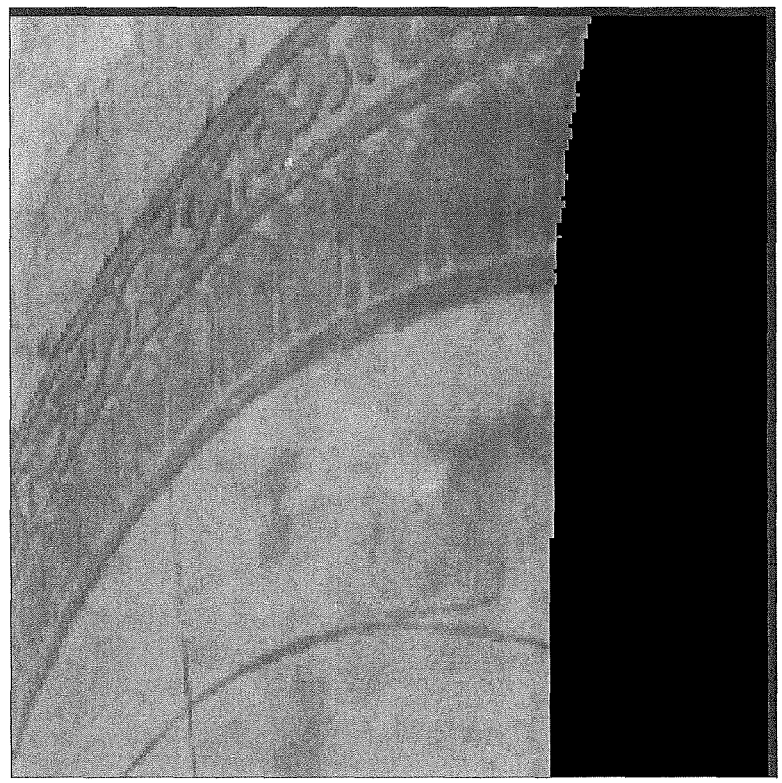
Figure 4M:
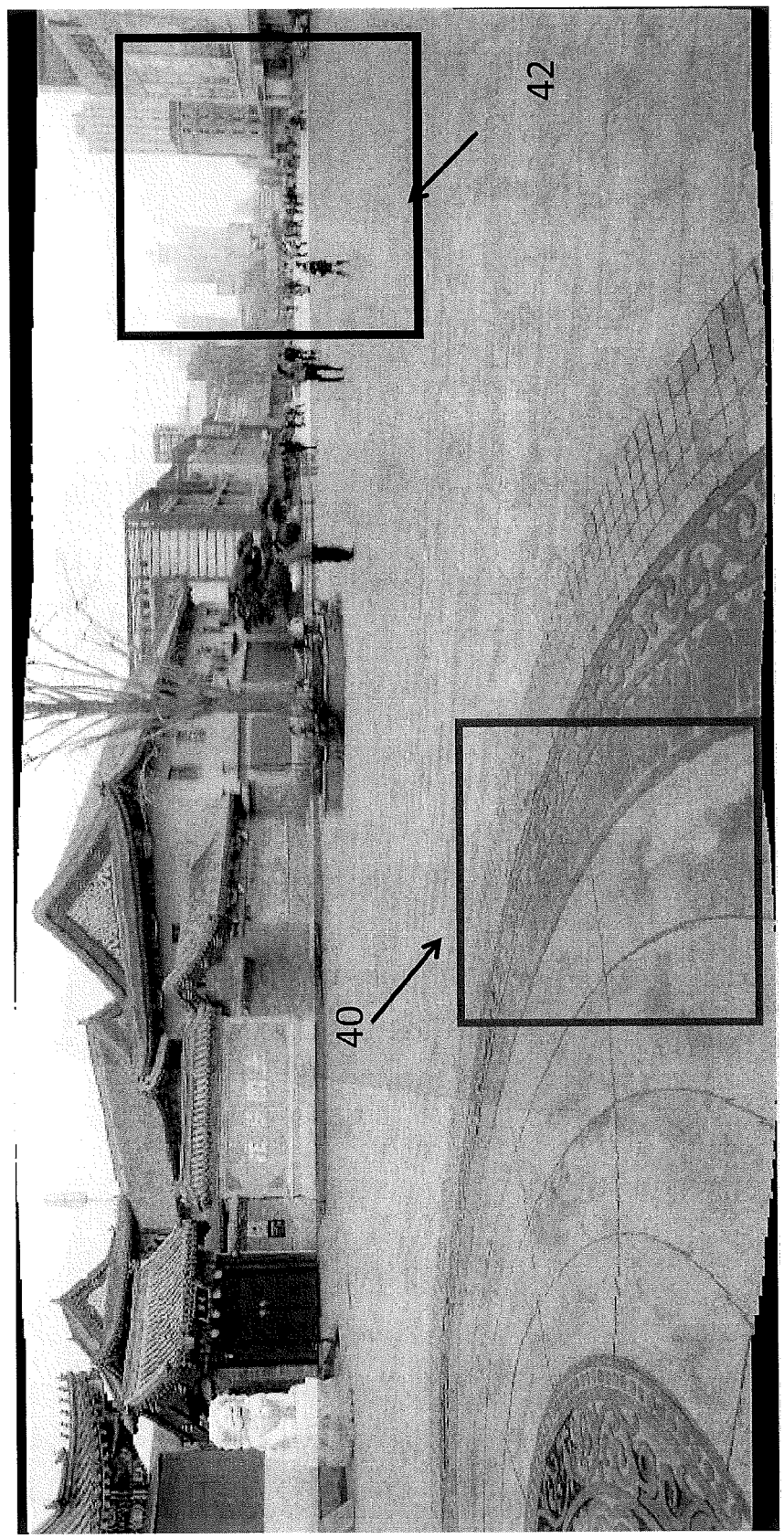
Figure 4O:
Figure 4N:

The results for the Temple dataset are provided in FIGS. 4A to 4O. Each row is a result of different methods. The results are in the following order: ICE, APAP, SPHP, SPHP+APAP, and the present method. Two areas of each results have been highlighted. Red boxes 40 show parallax error in overlapping areas, and blue boxes 42 show the perspective distortion in nonoverlapping areas. The result of ICE look good visually. The perspective is kept but there is some misalignment on the ground. The APAP results on the second row, as discussed in the previous section, show good alignment on the overlapping areas, but the perspective distortion on nonoverlapping area is non-negligible, for the reasons discussed before. The third row shows the results of SPHP method. As described in SPHP paper, it pays more attention to mitigating the perspective distortion but not the alignment accuracy. The result shows the shape is preserved but parallax errors exist. To alleviate the parallax errors, authors of SPHP suggest to combine SPHP with APAP. The results in the next row show the parallax errors are improved. However in both SPHP and SPHP+APAP, the building on the right side are not parallel to temples. This is because the similarity transformation is derived from the global homography and hence may not be optimal. This is particularly true, if there are multiple distinct planes in the overlapping areas, just like in the image. This can be corrected only if the rotation angle of the camera is known. The results in the last row show that our method mitigates the perspective distortion and can also deal with parallax issue.

Figure 5A:
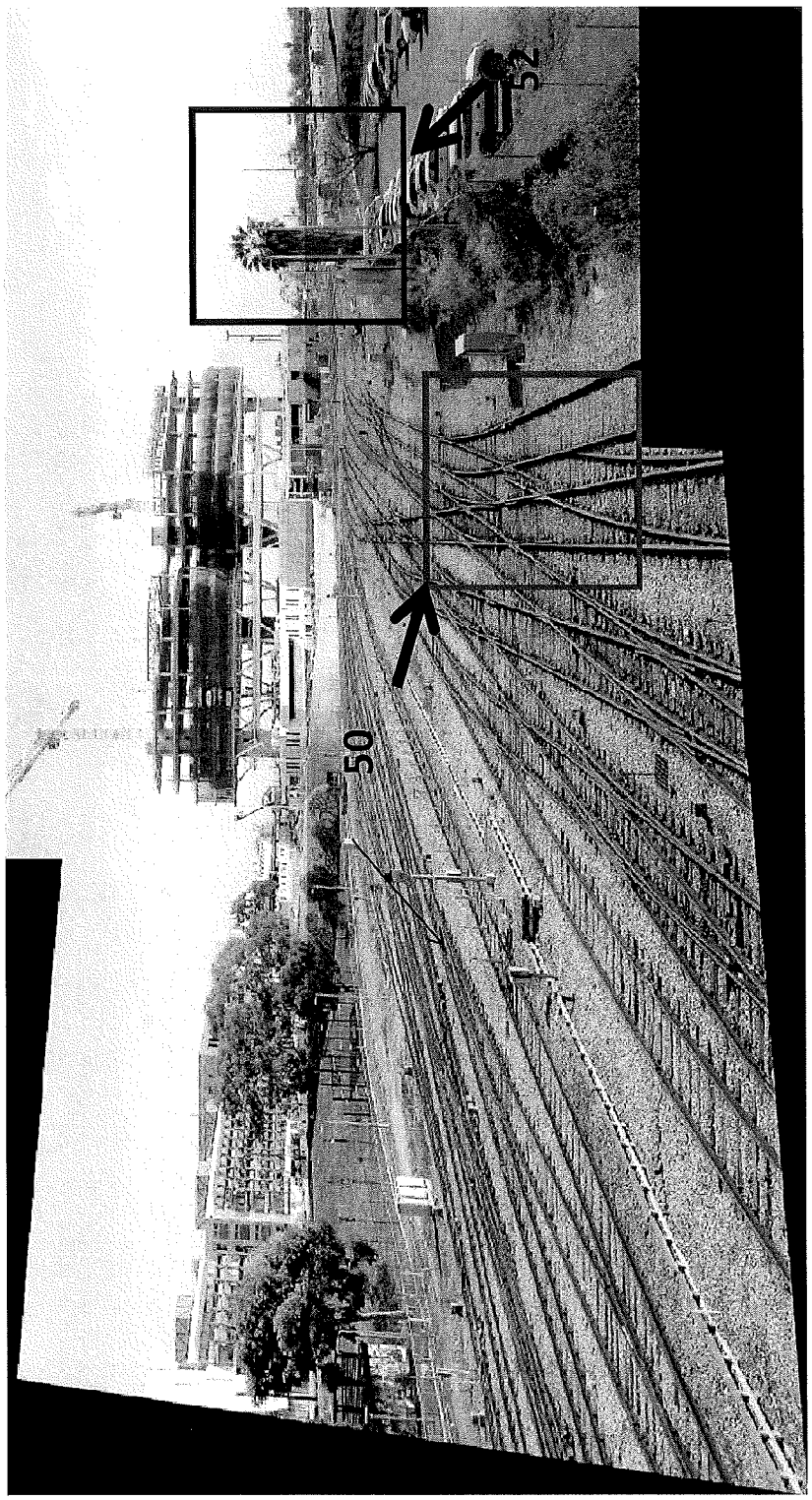
FIGS. 5A to 5O illustrates comparisons with state-of-the-art image stitching techniques on the railtracks image dataset.
Figure 5C:
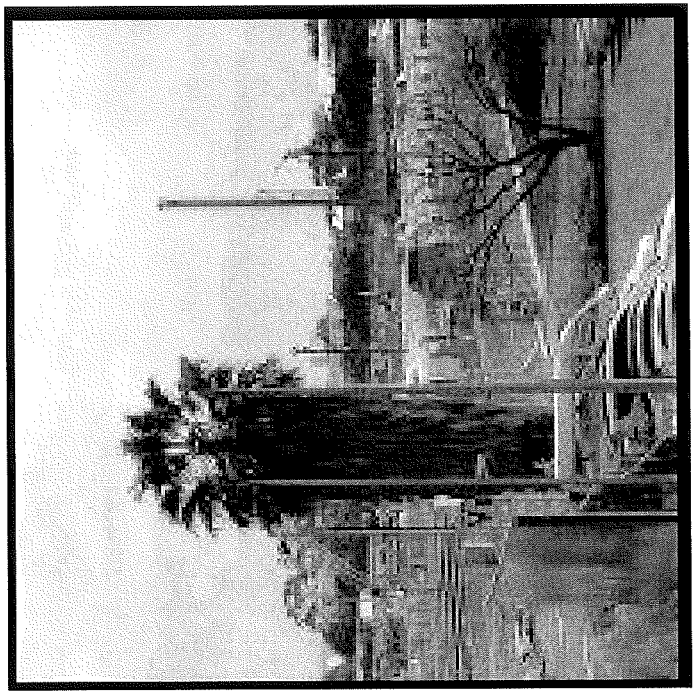
Figure 5B:
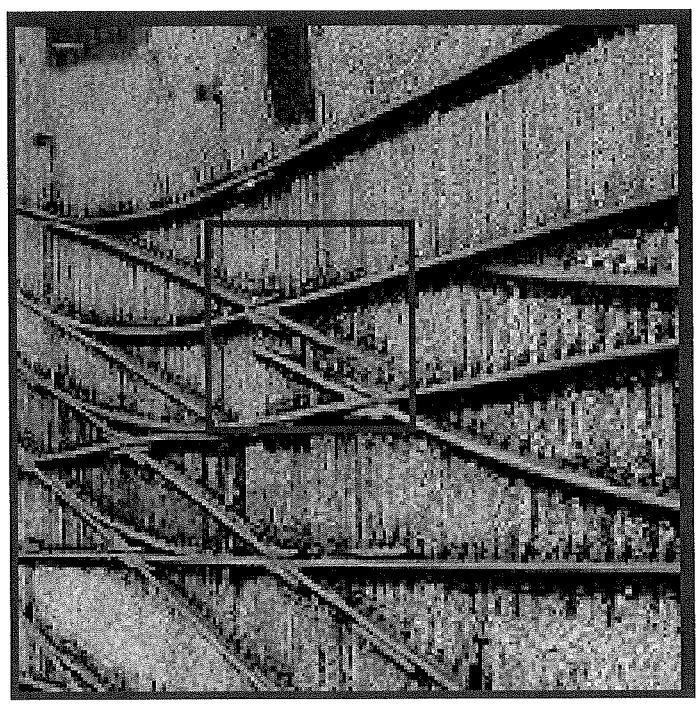
Figure 5D:
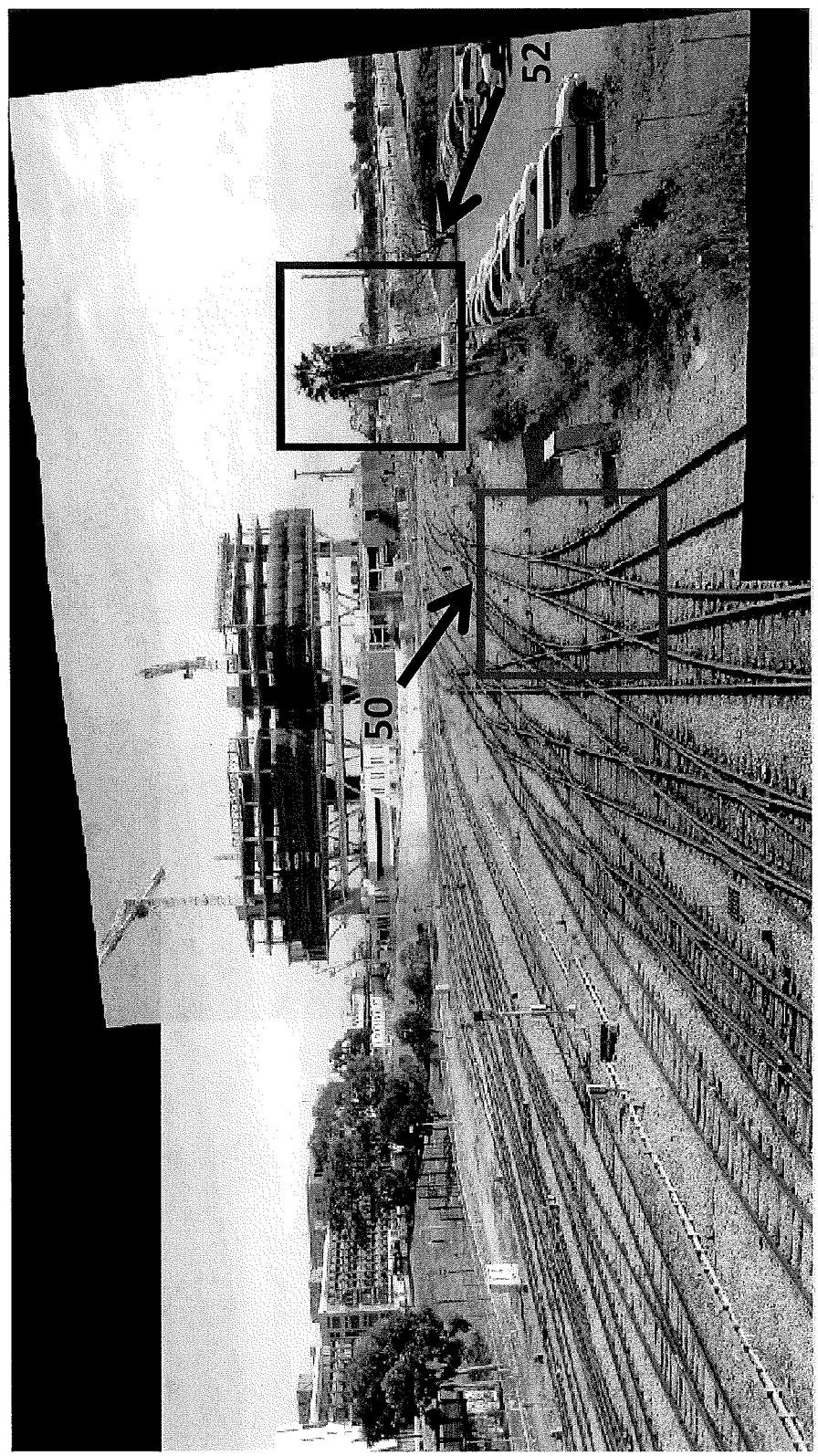
Figure 5E:
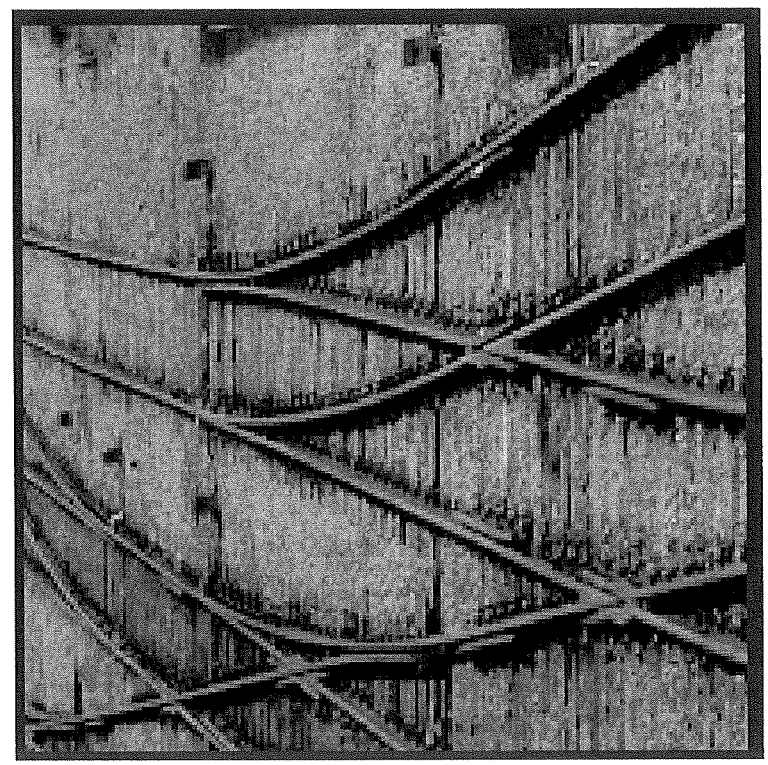
Figure 5F:
Figure 5G:
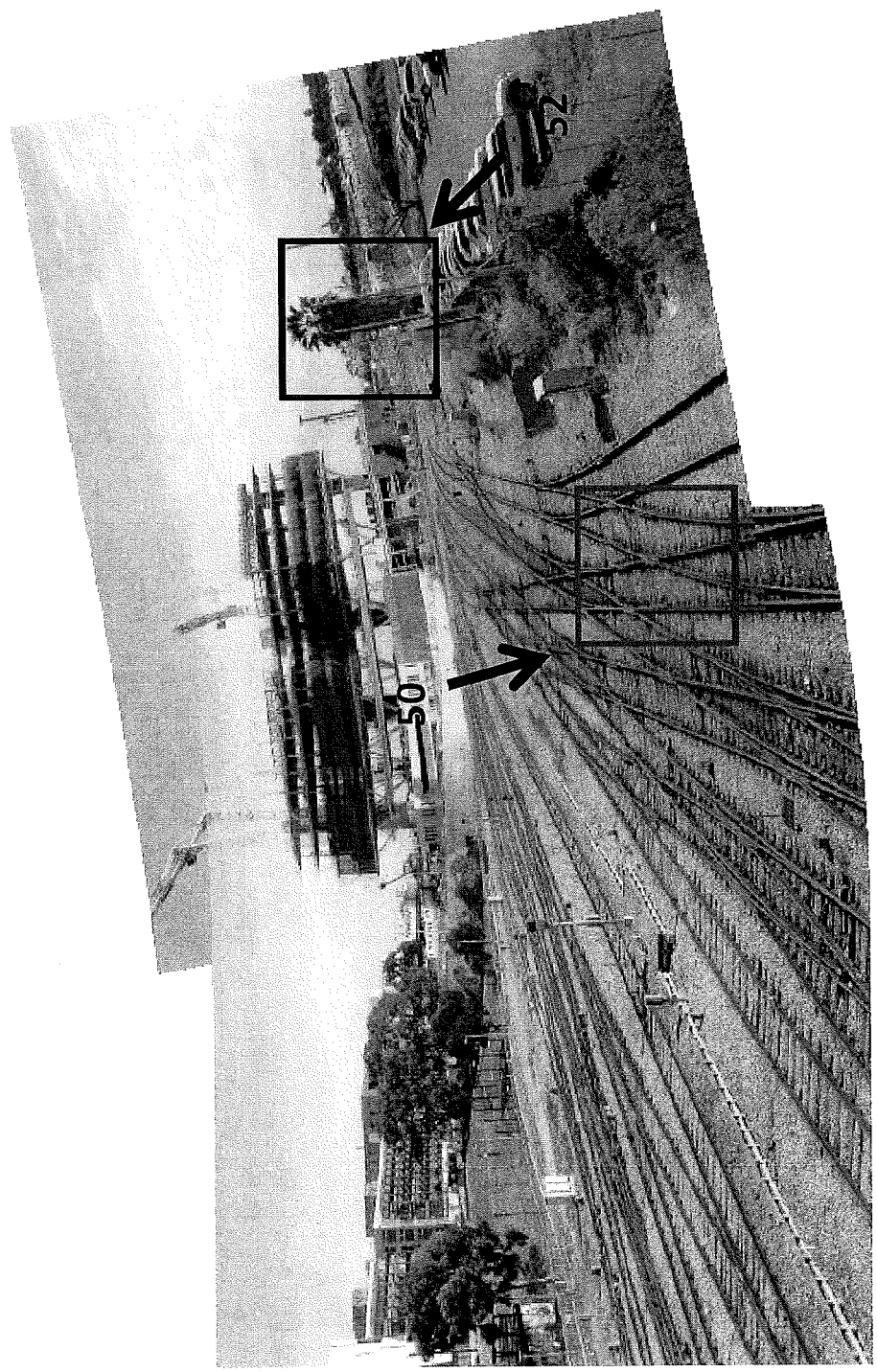
Figure 5I:
Figure 5H:
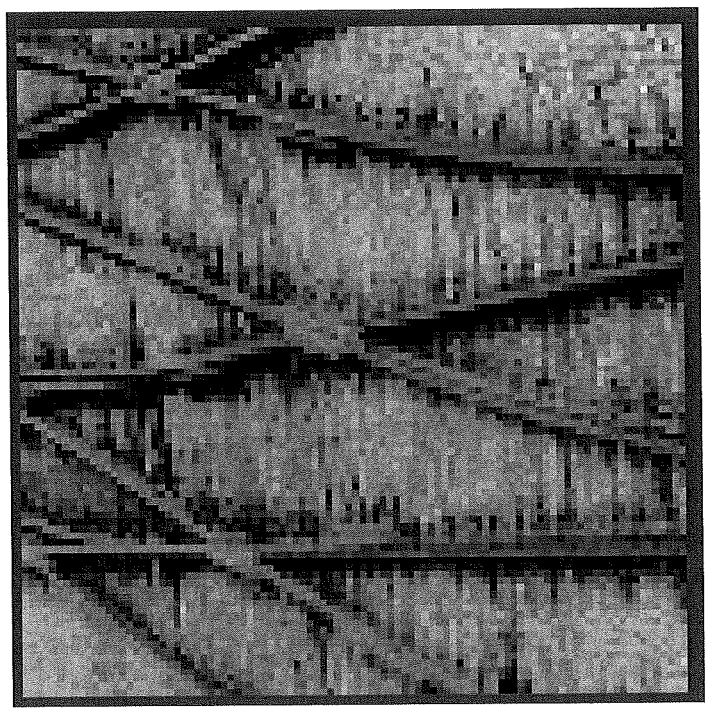
Figure 5J:
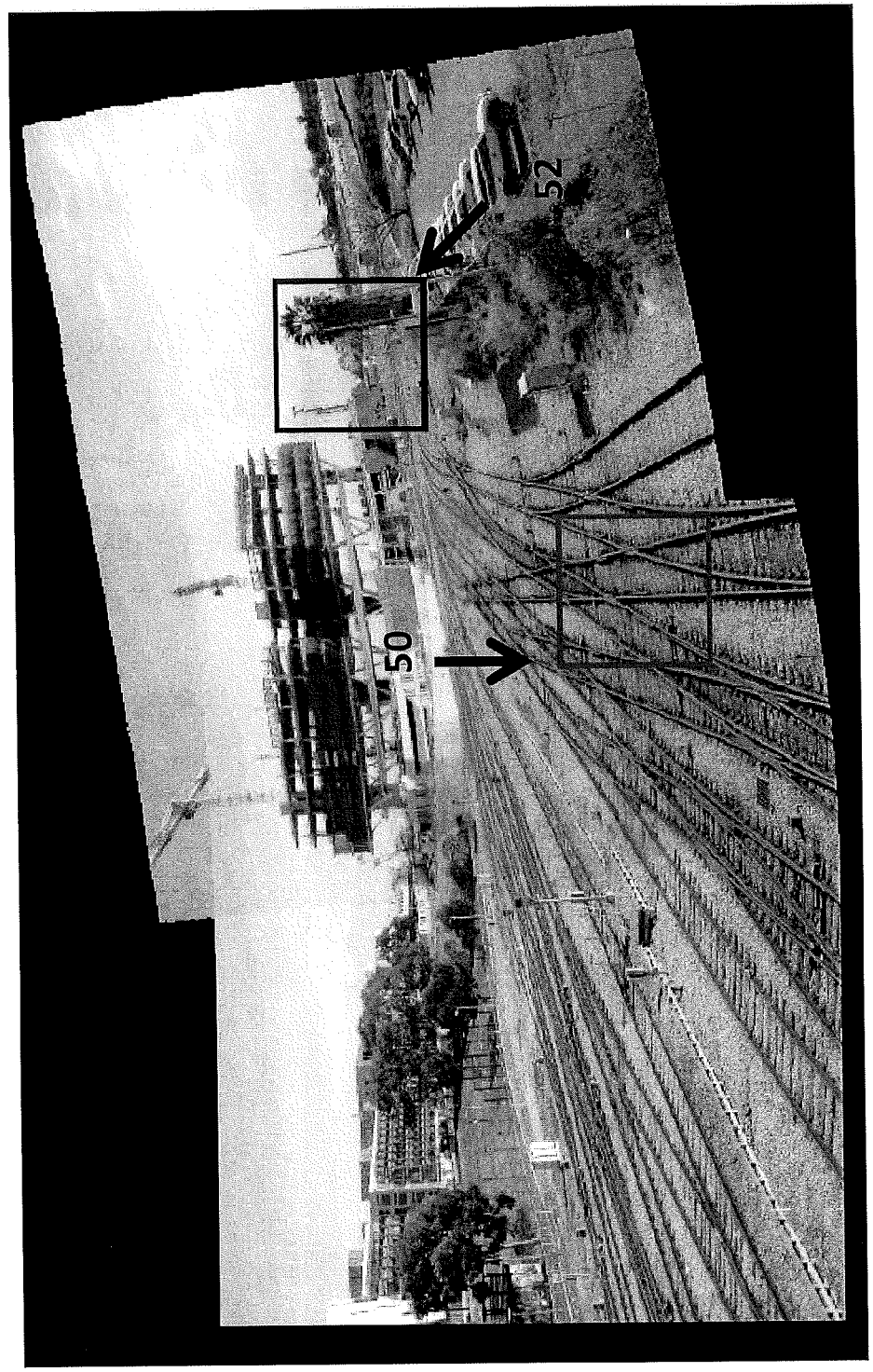
Figure 5L:
Figure 5K:
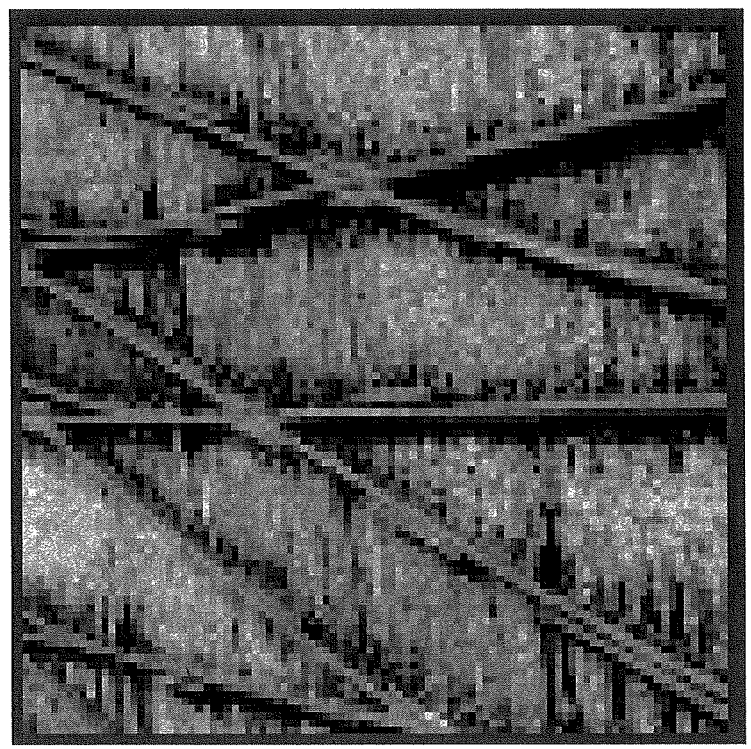
Figure 5M:
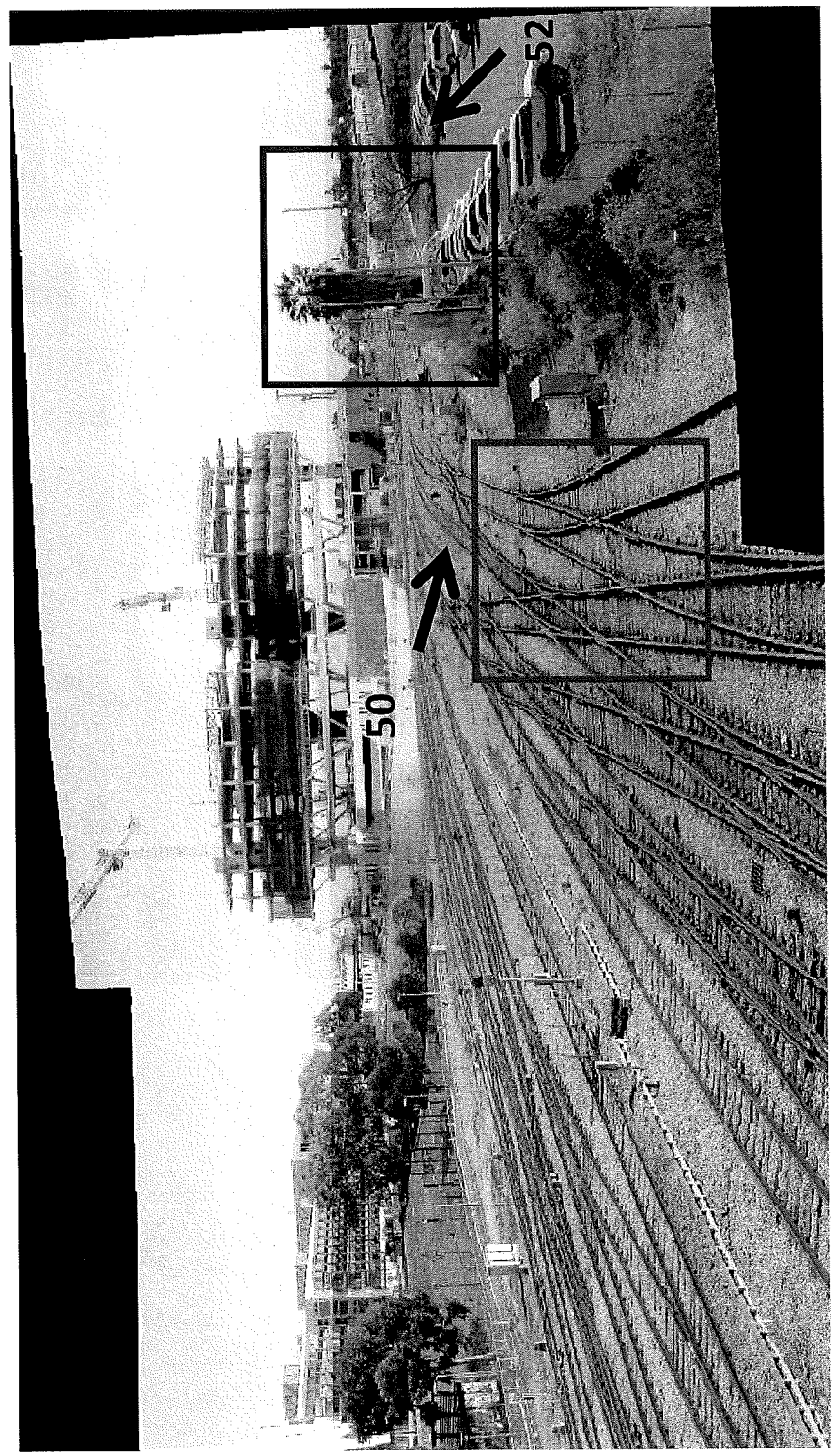
Figure 5O:
Figure 5N:
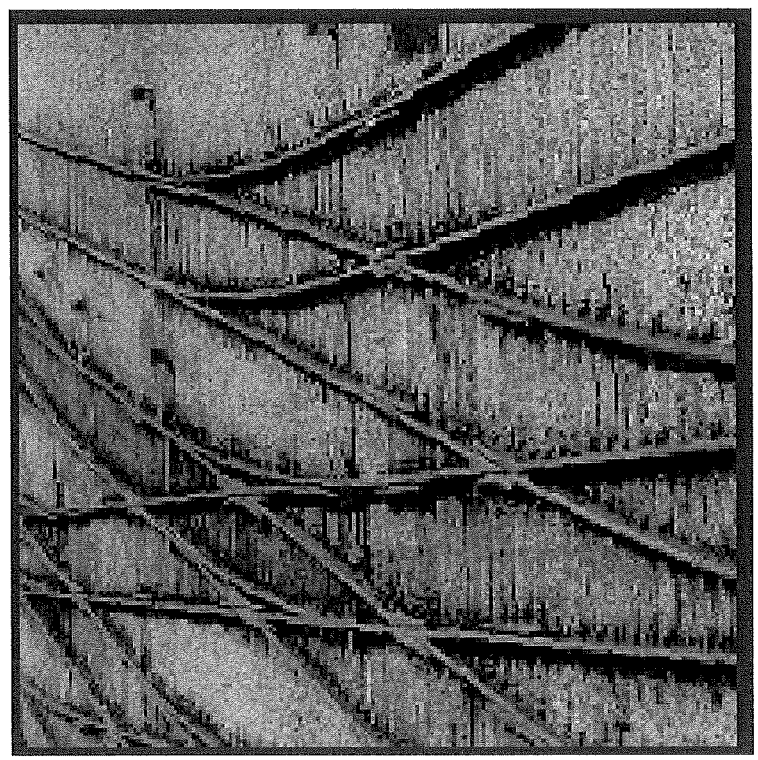
Figure 6A:
FIGS. 6A to 6B illustrate panorama of roundabout images.
Figure 6B:
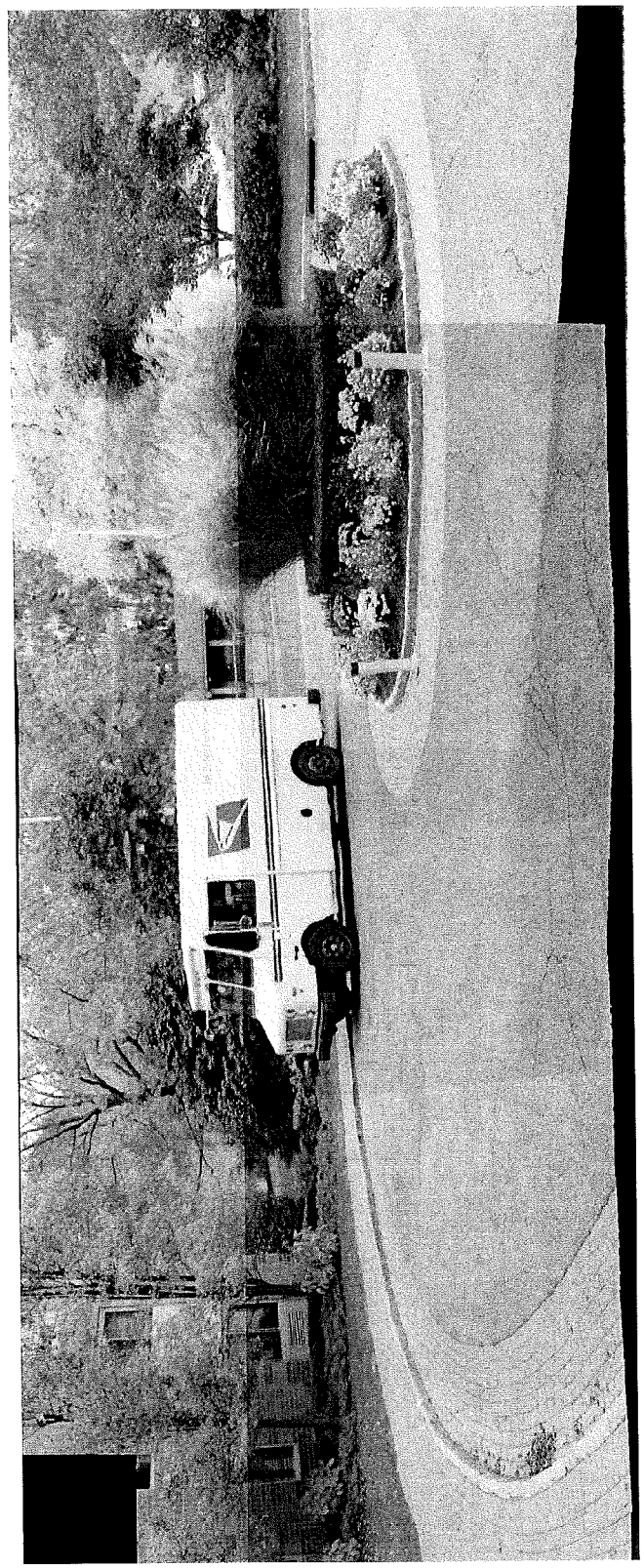
Figure 7A:
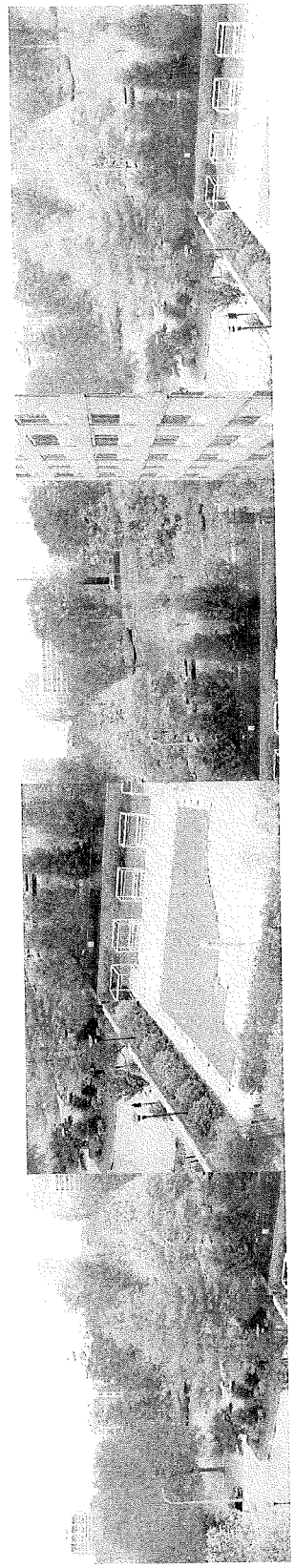
FIGS. 7A to 7B illustrate panorama of skyline images.
Figure 7B:
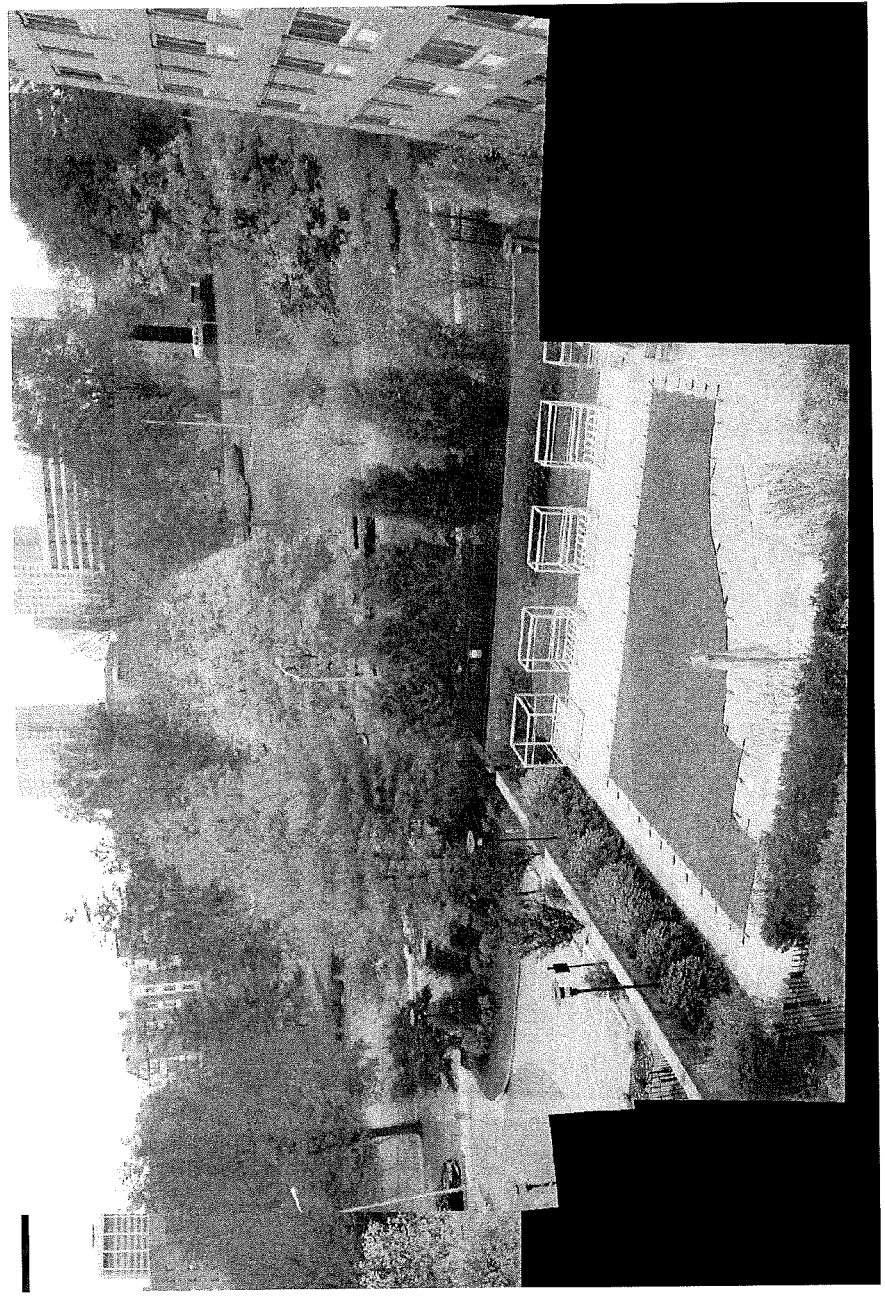

FIGS. 5A to 5O show the comparison results of Railtracks dataset. Red boxes 50 show parallax error in overlapping areas, and blue boxes 52 show the perspective distortion in nonoverlapping areas. One can still see parallax error 50 in ICE and perspective issues in APAP. Without manually correcting the rotation angle, the results from SPHP and SPHP+APAP do not look very natural. The method of the disclosed invention maintains alignment accuracy and shows robustness in this challenging example. The panorama examples that follow demonstrate the performance of method of the disclosed invention with multiple images. The image dataset in FIGS. 6A to 6B consist of a truck, a roundabout, and an arced ground surface. The images in FIGS. 7A to 7B include skylines, buildings, trees, and a swimming pool. The present method works well in both datasets, maintaining the integrity of image contents, and providing a natural look to the panorama. There are no visible parallax errors and perspective distortions.

As indicated above, a goal is to warp both images to fit each other. A first illustrative approach (see FIG. 8) includes a technique to get matched feature points, and remove outlier, calculate similarity transformation, generate virtual matched points, and calculate piecewise projective transformations for both images. A second illustrative approach a technique to first get matched feature points, and remove outlier, then calculate piecewise projective transformations on overlapping area, and then use linearized homography to extrapolate non-overlapping area. The two illustrative approaches are provided further detail as follows.

First Illustrative Approach

Figure 8:
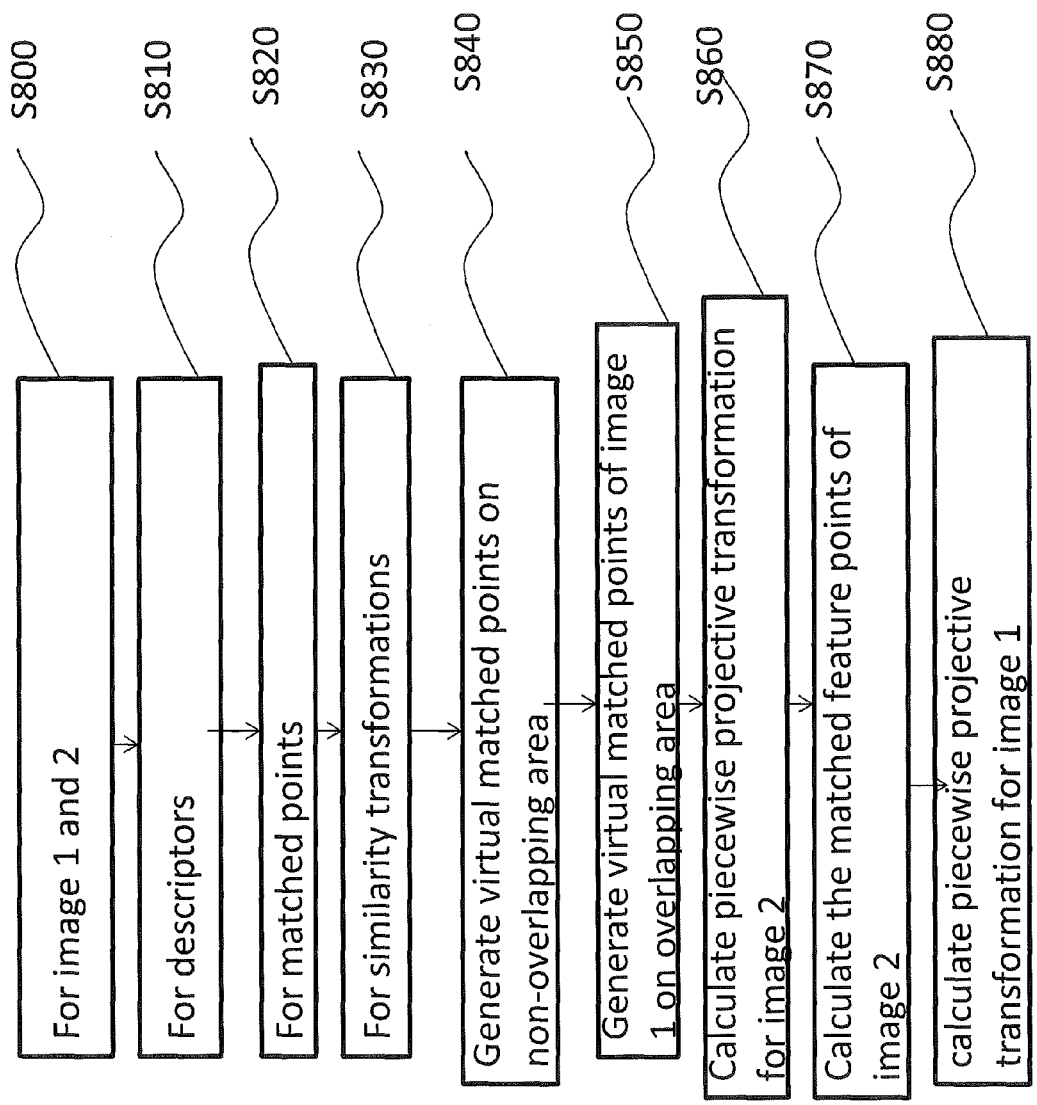
FIG. 8 illustrates a first illustrative approach of an example embodiment of the disclosed invention.

Referring to FIG. 8, for image 1 and 2, find the key points, and then find texture descriptors as seen in step S800. For descriptors, find matched feature points and then reduce outliers in step S810. For matched points, group matched points, and find similarity transformation for each group in step S820.

For similarity transformations, a computer processor finds similarity transformation with smallest rotation angle in step S830. Then the processor generates virtual matched points on non-overlapping area in step S840. Thereafter, the processor generates virtual matched points of image 1 on overlapping area in step S850. Then the processor calculates piecewise projective transformation for image 2 in step S860. Thereafter, the processor calculates the matched feature points of image 2 in step S870. Finally, the computer processor calculates piecewise projective transformation for image 1 in step S880.

Second Illustrative Approach

Figure 9:
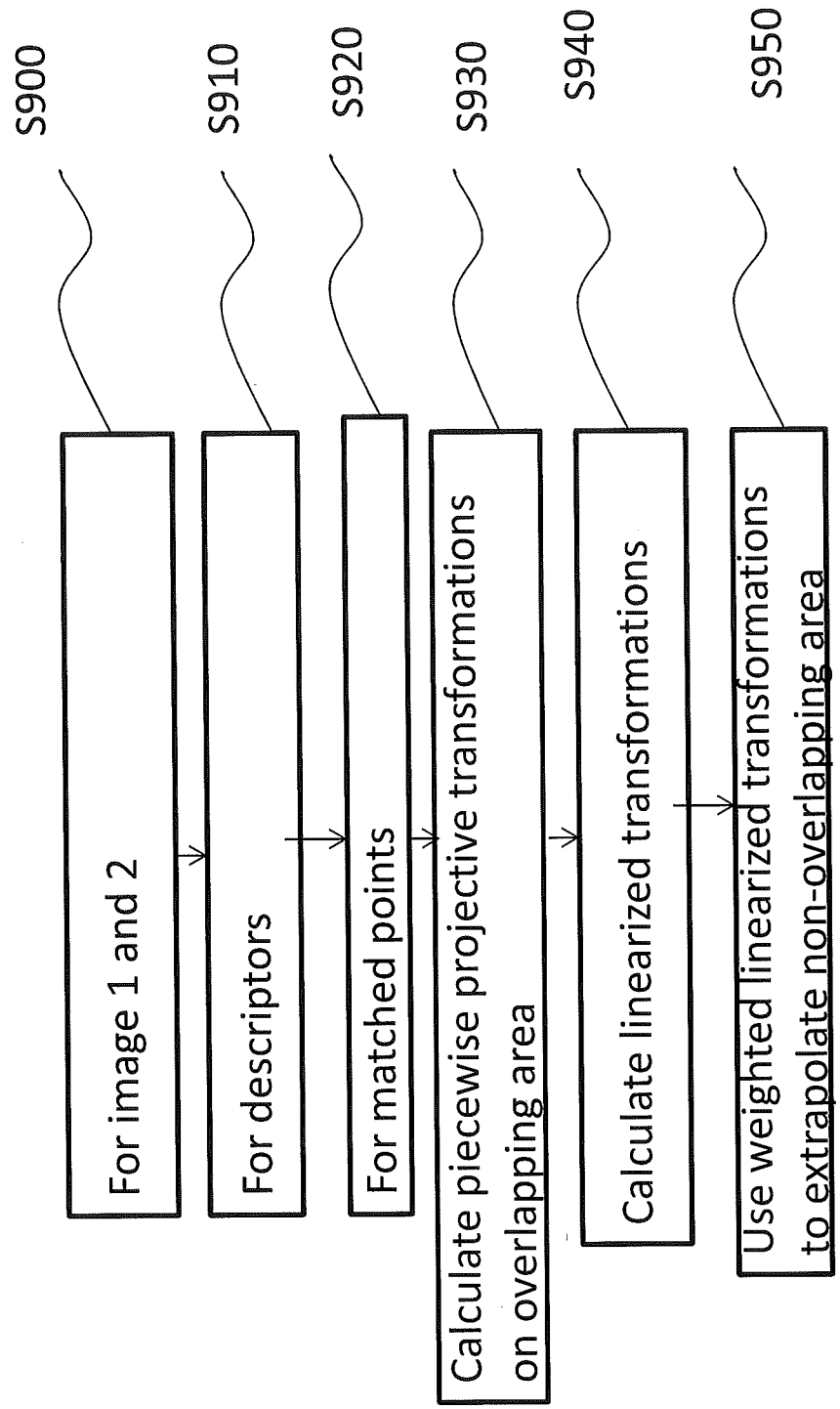
FIG. 9 illustrates a second illustrative approach of another example embodiment of the disclosed invention.

Referring to FIG. 9, the following are the steps for the second illustrative approach. For image 1 and 2, first find key points, and find texture descriptors in step S900. For descriptors, find matched feature points and reduce outliers in step S910. For matched points, group matched points and find similarity transformation for each group in step S920.

Thereafter, calculate piecewise projective transformations on overlapping area in step S930. Then, calculate linearized transformations in step S940. Finally, use weighted linearized transformations to extrapolate non-overlapping area in step S950.

In this work, a novel stitching method and apparatus that uses a smooth stitching field derived from local homography or its linearized version and a global similarity transformation. Results show that this approach provides a more natural panorama with no visible parallax in the overlapping regions and mitigates the perspective distortion issue in the non-overlapping regions. Furthermore, it is more robust to parameter selection and computes the appropriate global similarity transform automatically. Experimental comparisons to existing methods show that the method of the disclosed invention yields the best stitch compared to the state-of-the-art methods. This makes the disclosed invention's approach a one-stop solution that addresses all major problems in image stitching.

Summarizing Aerial Views

In another aspect of the invention, a method of summarizing aerial views are provided. A method detects objects and their activities from one or more moving cameras and overlays them on summary panorama of the view so that the entire panorama has least interference from the objects in the scene.

An illustrative method is as follows with reference to FIGS. 10A to 10D. Referring first to FIG. 10 A is set to equal 0 at step S80. For each video V in step S90, the following steps are performed with reference to FIG. 10B. First, detect objects and activities in the video at step S92. Then start an empty accumulator buffer BA to the first frame of the video and mark first frame of BA in Step 94. Then, set the first frame to be (common) reference frame in step S96.

Figure 10A:
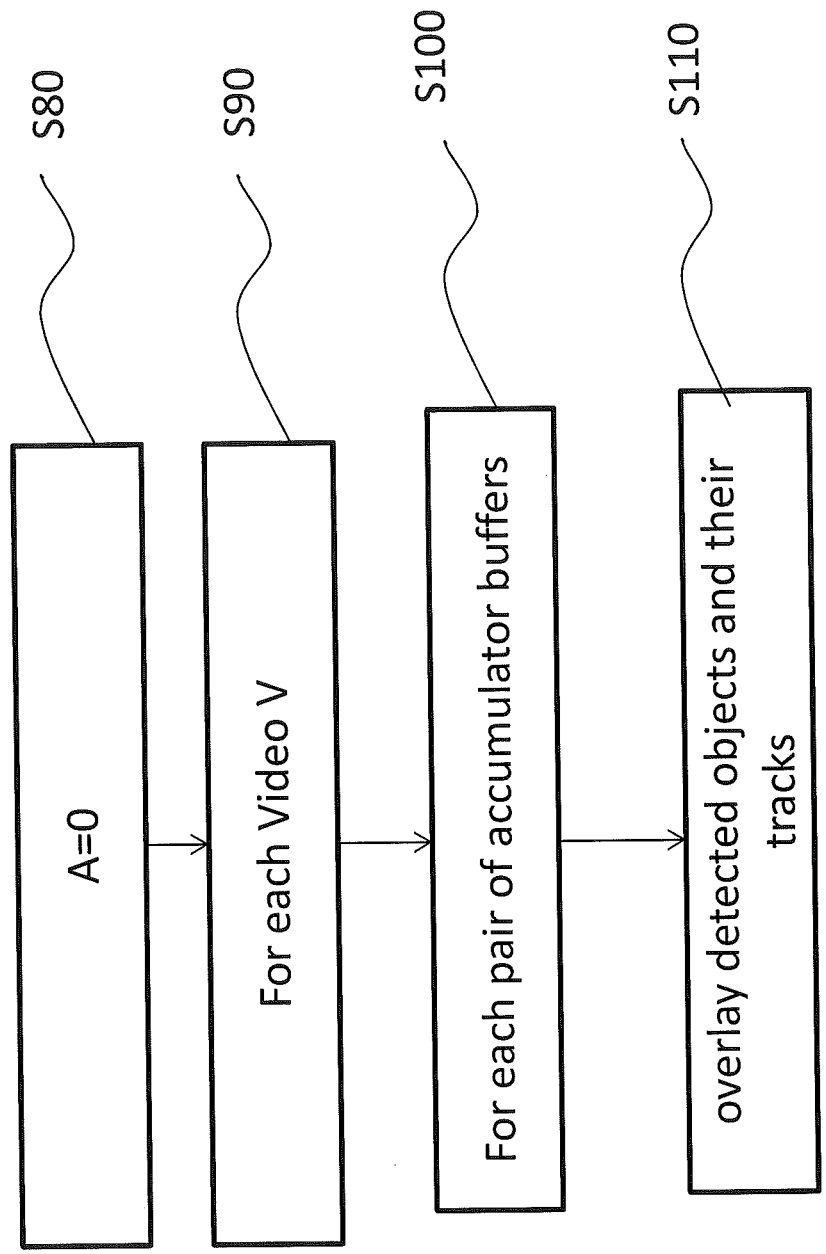
FIGS. 10A to 10D illustrate an example method of summarizing aerial views.
Figure 10B:
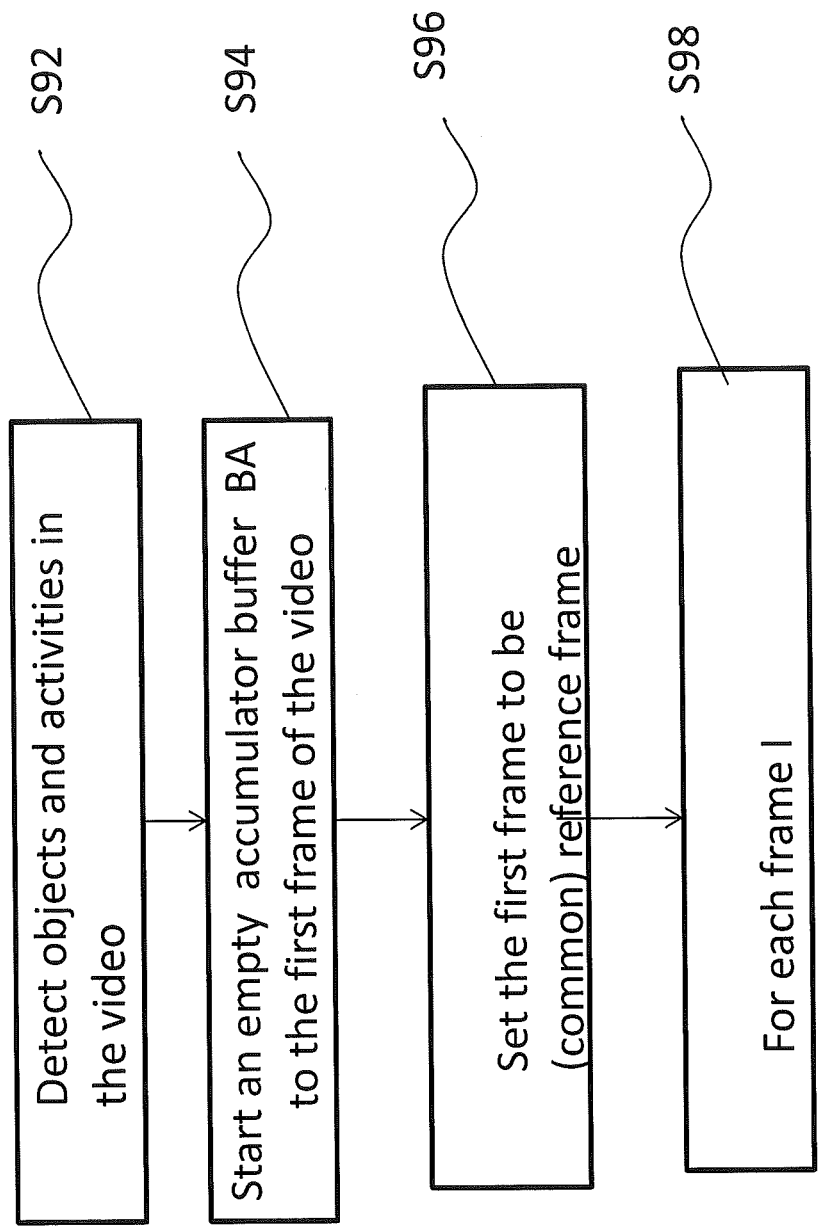
Figure 10C:
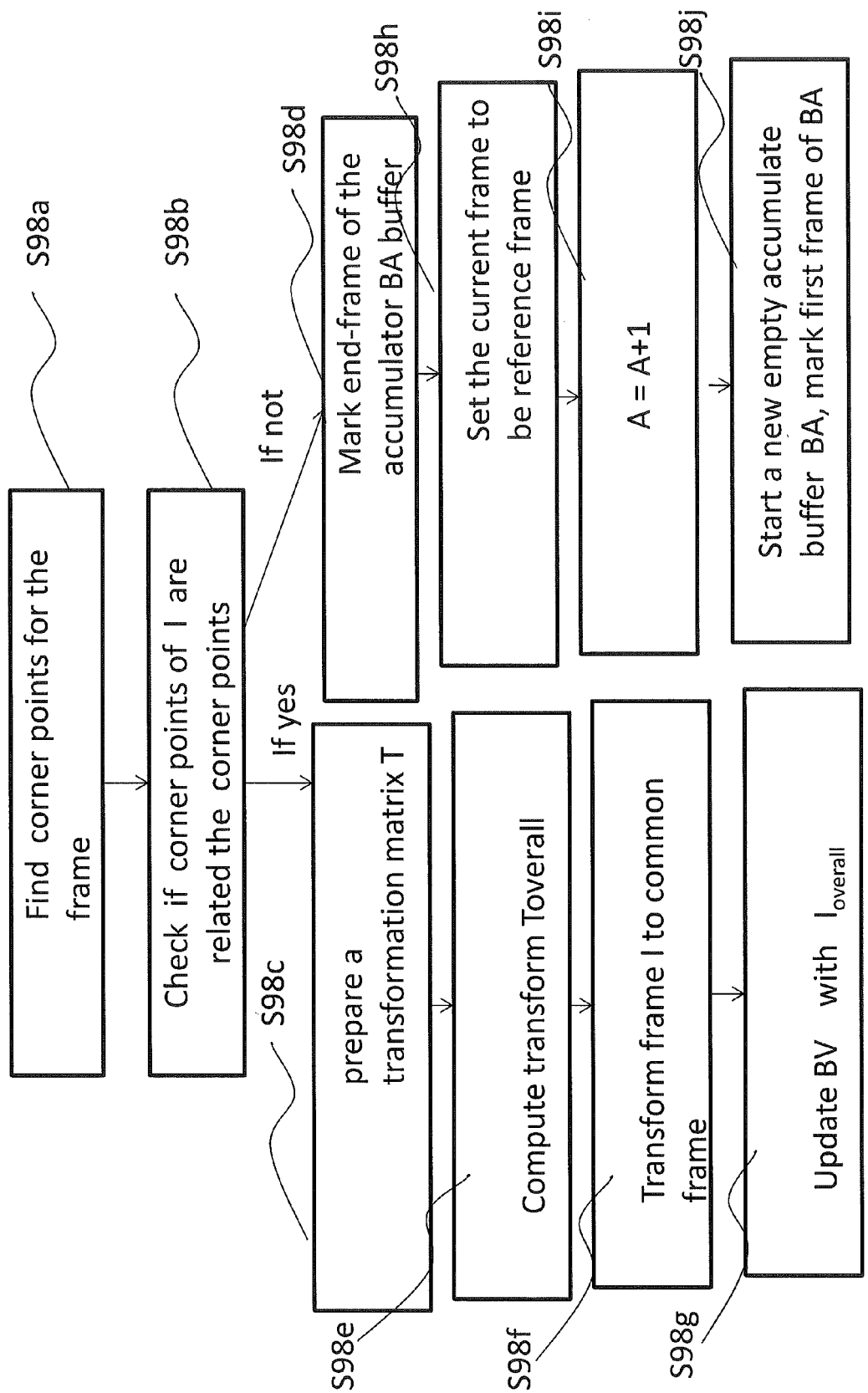

Thereafter, for each frame I in step S98, the following steps are performed with reference to FIG. 10C.

First, find corner points for the frame in step S98$a$. Then check if corner points of I are related the corner points of previous frame I−1 by homography in step S98$b$.

If "yes" is the answer to the determination in step S98$b$, then the following steps are performed. Prepare a transformation matrix T from I and I−1 in step S98$c$. Then compute transform $T_{overall}$ from frame I to reference frame in step S98$e$. Then transform frame I to common frame of reference $I_{overall}$ by applying Toverall to I in step 98$f$. Finally, update BV with $I_{overall}$ an bit-wise XOR operation in step S98$g$.

If "not" is the answer to the determination in step S98$b$, then the following steps are performed. Mark end-frame of the accumulator BA buffer in step S98$d$. Set the current frame to be reference frame in step 98$h$. Set A=A+1 in step 98$i$. Start a new empty accumulate buffer BA, mark first frame of BA in step 98$j$.

Figure 10D:
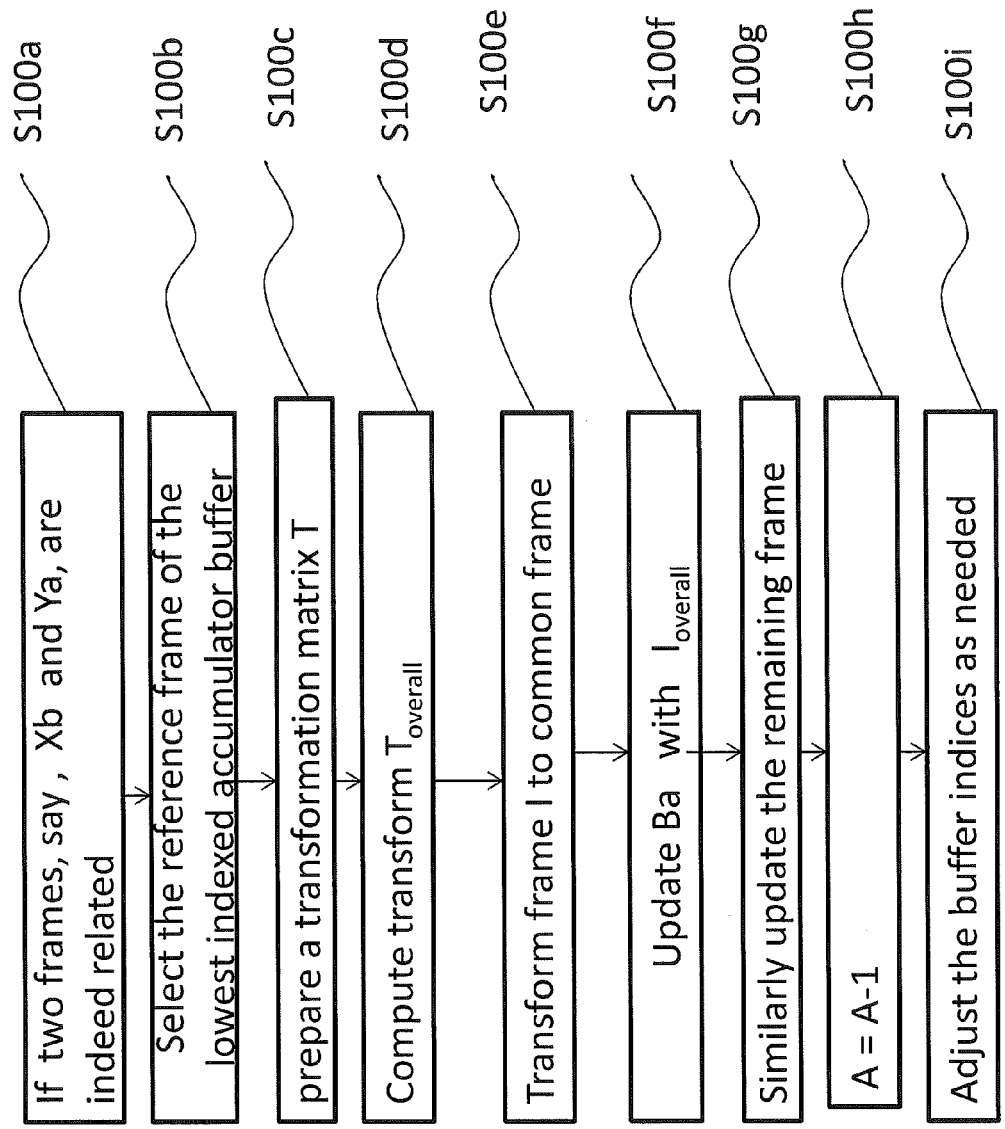

Then, referring to FIGS. 10A and 10D, for each pair of accumulator buffers, BC and BD check if corner points of either their start (Xa,Xb) or end (Ya,Yb) frames are related by an affine transform in step S100.

Referring to FIG. 10D, if two frames, say Xb and Ya, are determined to be indeed related in step S100$a$, then the following steps are performed.

Select the reference frame of the lowest indexed accumulator buffer Ba to be common reference frame, say, Xa in step S100$b$. Then prepare a transformation matrix T from Xb and Ya in step S100$c$. Then compute transform $T_{overall}$ from frame Xb to the reference frame Xa in step S100$d$. Then, transform frame I to common frame of reference Xa by applying $T_{overall}$ to Xb in step S100$e$.

Then, update Ba with $I_{overall}$ an bit-wise XOR operation in step S100$f$. Similarly update the remaining frame Xb+1 through Yb to Ba in step S100$g$. Then set A=A−1 in step S100$h$. Then finally, adjust the buffer indices as needed in step S100$i$.

Then, finally, referring back to FIG. 10A each accumulator buffer, overlay detected objects and their tracks in step S110.

Exemplary Hardware Implementation

Figure 11:
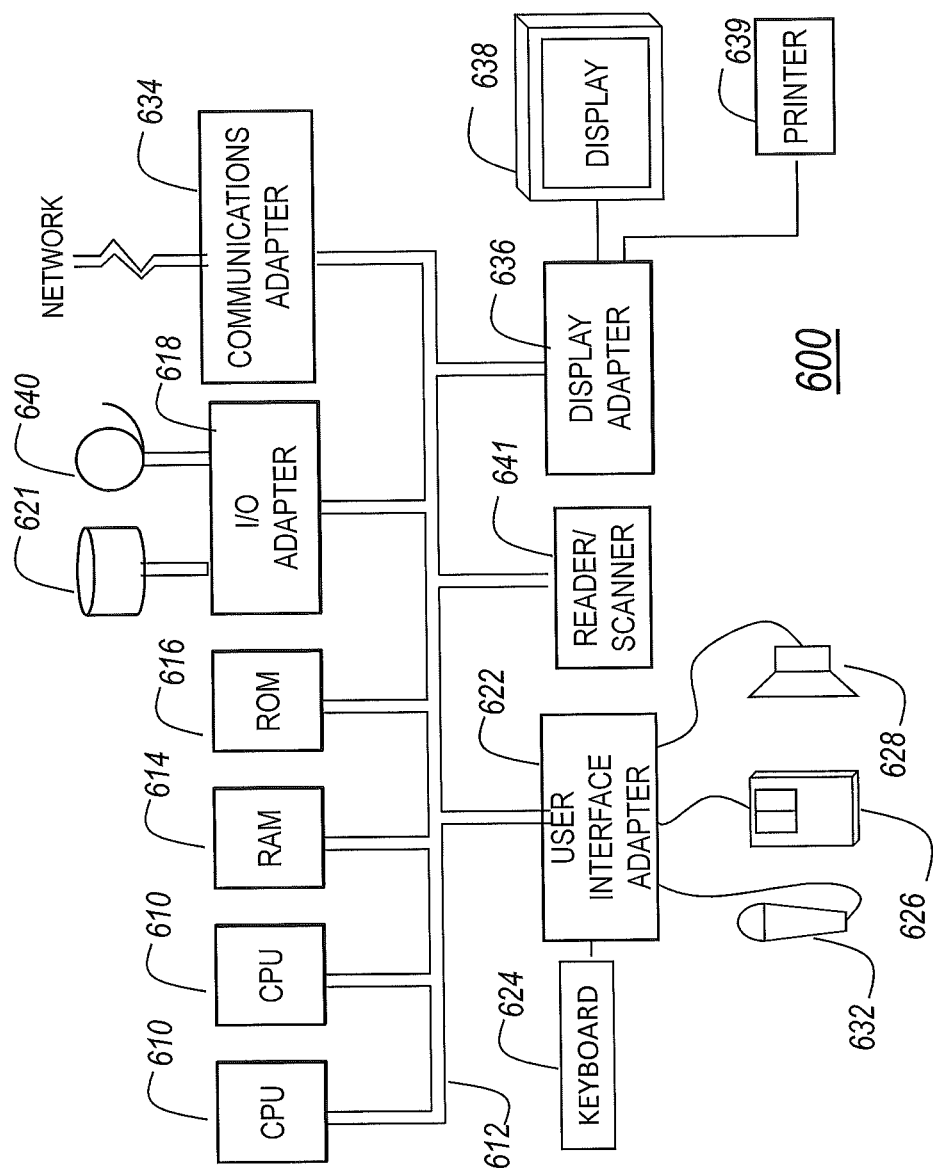
FIG. 11 illustrates an exemplary hardware/information handling system for incorporating the exemplary embodiment of the invention therein.

FIG. 11 illustrates a typical hardware configuration of an information handling/computer system 600 in accordance with the invention and which preferably has at least one processor or central processing unit (CPU) 611. The computer system 600 can implement the numerical scaling algorithm for mathematical programs with quadratic objectives and/or quadratic constraints.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 611 and hardware above, to perform the method of the invention.

This signal-bearing storage media may include, for example, a RAM contained within the CPU 611, as represented by the fast-access storage for example.

Figure 12:
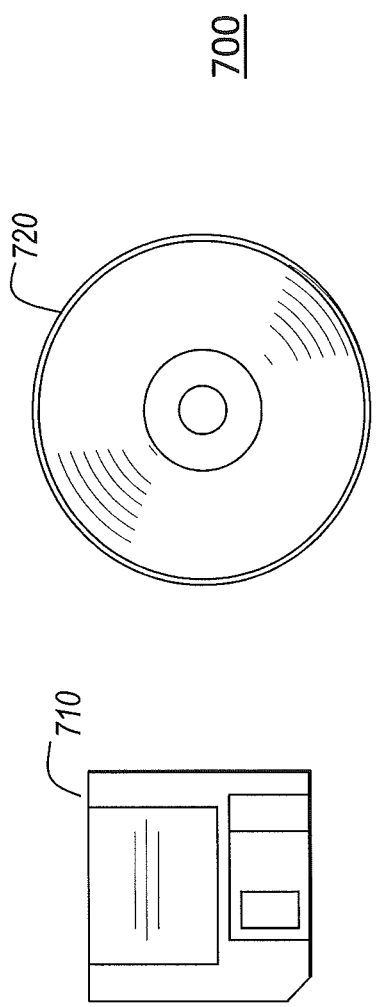
FIG. 12 illustrates a non-transitory signal-bearing storage medium for storing machine-readable instructions of a program that implements the method according to the exemplary embodiment of the invention.

Alternatively, the instructions may be contained in another signal-bearing storage media 700, such as a magnetic data storage diskette 701 or optical storage diskette 702 (FIG. 12), directly or indirectly accessible by the CPU 611. The storage media 700 can store the numerical scaling method for mathematical programs with quadratic objectives and/or quadratic constraints and can be executed by the CPU 611 of the computer system 600.

Whether contained in the diskette 701, 702, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including memory devices in transmission media, such as communication links and wireless devices, and in various formats, such as digital and analog formats. In an illustrative embodiment of the invention, the machine-readable instructions may comprise software object code.

Therefore, based on the foregoing exemplary embodiments of the invention, the numerical scaling method for mathematical programs with quadratic objectives and/or quadratic constraints can improve the accuracy of the computations and the overall stability of the implementation of the solving.

Although examples of the numerical scaling method are shown, alternate embodiments are also possible, including for example, numerical scaling methods for higher order problem solving and computation in computers or other machines that must compute high level mathematical problems.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of stitching a plurality of image views of a scene, the method comprising:
   extracting points of interest in each view to comprise a point set from each of the plurality of image views of the scene;
   matching the points of interest and reducing outliers;
   grouping the matched points of interest in a plurality of groups;
   determining a similarity transformation with smallest rotation angle for each grouping of the matched points;
   generating virtual matching points on non-overlapping area of the plurality of image views;
   generating virtual matching points on overlapping area for each of the plurality of image views; and
   calculating piecewise projective transformations for the plurality of image views.

2. The method according to claim 1, wherein the points of interest representations comprise translation-invariant representations of edge orientations.

3. The method according to claim 2, wherein the points of interest representations comprise scale invariant feature transform (SIFT) points.

4. The method according to claim 1 is stored in a non-transitory computer-readable medium and executed by a processor.

5. The method according to claim 1, wherein the plurality of views of a scene are remotely captured from an aerial view.

6. The method according to claim 1, wherein each group of the plurality of matched points is used to calculate an individual similarity transformation, and then the rotation angles corresponding to the transformations are examined and a one with the smallest rotation angle is selected.

7. The method according to claim 1, further comprising, when extracting the points of interest, for each of the plurality of views, finding key points and texture descriptors.

8. A system of stitching a plurality of views of a scene, the system comprising:
   a non-transitory computer-readable medium storing data including the plurality of views of the scene; and
   a processor processing the data on the non-transitory computer-readable medium,
   wherein the processor extracts points of interest in each view stored on the computer-readable medium to comprise a point set from each of the plurality of image views of the scene,
   wherein the processor matches the points of interest and reduces an outlier,
   wherein the processor groups the matched points of interest in a plurality of groups,
   wherein the processor determines a similarity transformation for each group of the matched points, and
   wherein the processor calculates piecewise projective transformations for the plurality of image views.

9. The system according to claim 8, wherein the processor calculates piecewise projective transformations for the plurality of image views on overlapping areas.

10. The system according to claim 8, wherein the processor determines the similarity transformation with a smallest rotation angle for each group of the matched points.

11. The system according to claim 8, wherein the processor calculates linearized transformations for the plurality of image views.

12. The system according to claim 8, wherein the processor uses weighted linearized transformations to extrapolate non-overlapping areas.

13. The system according to claim 8, wherein the processor generates virtual matching points on a non-overlapping area of the plurality of image views, and
   wherein the processor generates virtual matching points on an overlapping area for each of the plurality of image views.

14. The system according to claim 8, wherein the points of interest representations comprise translational invariant representations of edge orientations.

15. The system according to claim 14, wherein the points of interest representations comprise scale invariant feature transform (SIFT) points.

16. The system according to claim 8, wherein the plurality of views of a scene are remotely captured from an aerial view and stored on the non-transitory computer-readable medium for execution by the processor.

17. The system according to claim 8, wherein each group of the plurality of matched points is used to calculate an individual similarity transformation, then the rotation angles corresponding to the transformations are examined and a one with the smallest rotation angle is selected by the processor.

18. A method of developing summary visualization of the visual content in a plurality of videos of a scene, the method comprising:
   processing the videos to extract objects and activities of interest;
   establishing a frame of reference with respect to a visual content of a video so that the objects in a scene provide a least distracting view of the scene according to a predetermined criteria;
   for each candidate frame in the video, relating a portion of its content with a portion of another frame of a gallery frame by finding a common portion of visual content in the corresponding frames;
   relating the portion of the candidate frame to a common frame of reference by finding a chain of successive relationships that relate a candidate frame content to the reference video frame;
   visualizing an overall content by rendering contents of the video frames in common frame of reference as a mosaic; and
   overlaying the objects and activities of interest on the mosaic.

19. The method as claimed in claim 18, wherein a user interface provides interaction with overlays to see details of the objects and the activities including the original video.

20. The method as claimed in 18, wherein the activities are tracks,
   wherein the common reference is related to a geographic map, and
   wherein a user interface queries and searches the objects and activities.

21. A system comprising a non-transitory computer-readable medium and a processor executing the method according to claim 18.

22. A method of stitching a plurality of image views of a scene, the method comprising: extracting a set of matched points of interest from each pair of the plurality of image views of the scene;
   grouping the matched points of interest in a plurality of groups;
   determining a similarity transformation with a smallest rotation angle for each group of the matched points;
   generating virtual matching points on a non-overlapping area of the plurality of image views;

generating virtual matching points on an overlapping area for each of the plurality of image views; and calculating piecewise projective transformations for the plurality of image views.

* * * * *